(12) United States Patent
Kim et al.

(10) Patent No.: US 7,324,424 B2
(45) Date of Patent: Jan. 29, 2008

(54) COMPATIBLE OPTICAL PICKUP HAVING DIFFRACTIVE DEVICE TO CORRECT CHROMATISM AND DIVERGENT LENS TO INCREASE WORKING DISTANCE

(75) Inventors: Tae-kyung Kim, Seoul (KR); Young-man Ahn, Suwon-si (KR); Chong-sam Chung, Suwon-si (KR); Hae-jung Suh, Hwaseong-si (KR); Jin-kyung Lee, Suwon-si (KR); Jong-bae Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 805 days.

(21) Appl. No.: 10/295,044

(22) Filed: Nov. 15, 2002

(65) Prior Publication Data

US 2003/0107979 A1    Jun. 12, 2003

(30) Foreign Application Priority Data

Nov. 15, 2001 (KR) ............... 2001-71094
Jul. 23, 2002 (KR) ............... 2002-43282

(51) Int. Cl.
*G11B 7/135* (2006.01)

(52) U.S. Cl. ............... 369/112.07; 369/112.17; 369/112.01

(58) Field of Classification Search ........... 369/112.07; G11B 7/00
See application file for complete search history.

(56) References Cited

U.S. PATENT DOCUMENTS 5,815,293 A  9/1998  Komma et al.
5,872,761 A  2/1999  Sugi et al.
6,201,780 B1  3/2001  Katayama
6,430,137 B1 *  8/2002  Saimi et al. ............. 369/112.1
6,449,095 B1  9/2002  Ohtaki et al.
6,643,245 B2 *  11/2003  Yamamoto et al. .... 369/112.01
6,650,612 B1 *  11/2003  Matsuzaki et al. ..... 369/112.05

(Continued)

FOREIGN PATENT DOCUMENTS

CN    1294383    5/2001

(Continued)

OTHER PUBLICATIONS

Joseph E. Ford, Fang Xu and Yeshayahu Fainman, Jan. 1, 1996, Optics Letters, vol. 21, No. 1, pp. 80-82.*

(Continued)

*Primary Examiner*—Thang V. Tran
*Assistant Examiner*—Joseph Haley
(74) *Attorney, Agent, or Firm*—Stein, McEwen & Bui, LLP

(57) ABSTRACT

A compatible optical pickup includes an optical disc, an objective lens, a diffractive device, and a divergent lens. The optical unit emits a short wavelength light beam corresponding to a high density optical disc and a long wavelength light beam corresponding to a low density optical disc. The objective lens forms a light spot on the high density optical disc and the low density optical disc and the diffractive device diffracts the short wavelength light beam to correct chromatism according to a change in a wavelength of the short wavelength light beam. The divergent lens refracts the long wavelength light beam toward the objective lens to increase a working distance with respect to the low density optical disc.

48 Claims, 14 Drawing Sheets

U.S. PATENT DOCUMENTS

| | | | |
|---|---|---|---|
| 6,853,614 B2 * | 2/2005 | Kim et al. | 369/112.01 |
| 7,057,659 B1 * | 6/2006 | Mihara et al. | 348/345 |
| 2004/0036972 A1 * | 2/2004 | Kimura et al. | 359/570 |

FOREIGN PATENT DOCUMENTS

| | | |
|---|---|---|
| EP | 1096483 | 5/2001 |
| EP | 1 154 417 | 11/2001 |
| JP | 10-214431 | 8/1998 |
| JP | 10-334504 | 12/1998 |
| JP | 2000-155974 | 6/2000 |
| JP | 2001-14714 | 1/2001 |
| JP | 2001-93179 | 4/2001 |
| JP | 2001176109 | 6/2001 |
| JP | 2001-209966 | 8/2001 |
| JP | 2001209966 | 8/2001 |
| JP | 2005122899 | 5/2005 |
| WO | WO 00/65583 | 11/2000 |
| WO | WO 01/48746 | 7/2001 |
| WO | WO 01/48746 A1 | 7/2001 |

OTHER PUBLICATIONS

Search Report issued in European Patent Application No. 02257141.8 on Feb. 9, 2006.

* cited by examiner

RADIAL DIRECTION

—— PHASE DIFFERENCE TO $\lambda_1$
—·— PHASE DIFFERENCE TO $\lambda_2$

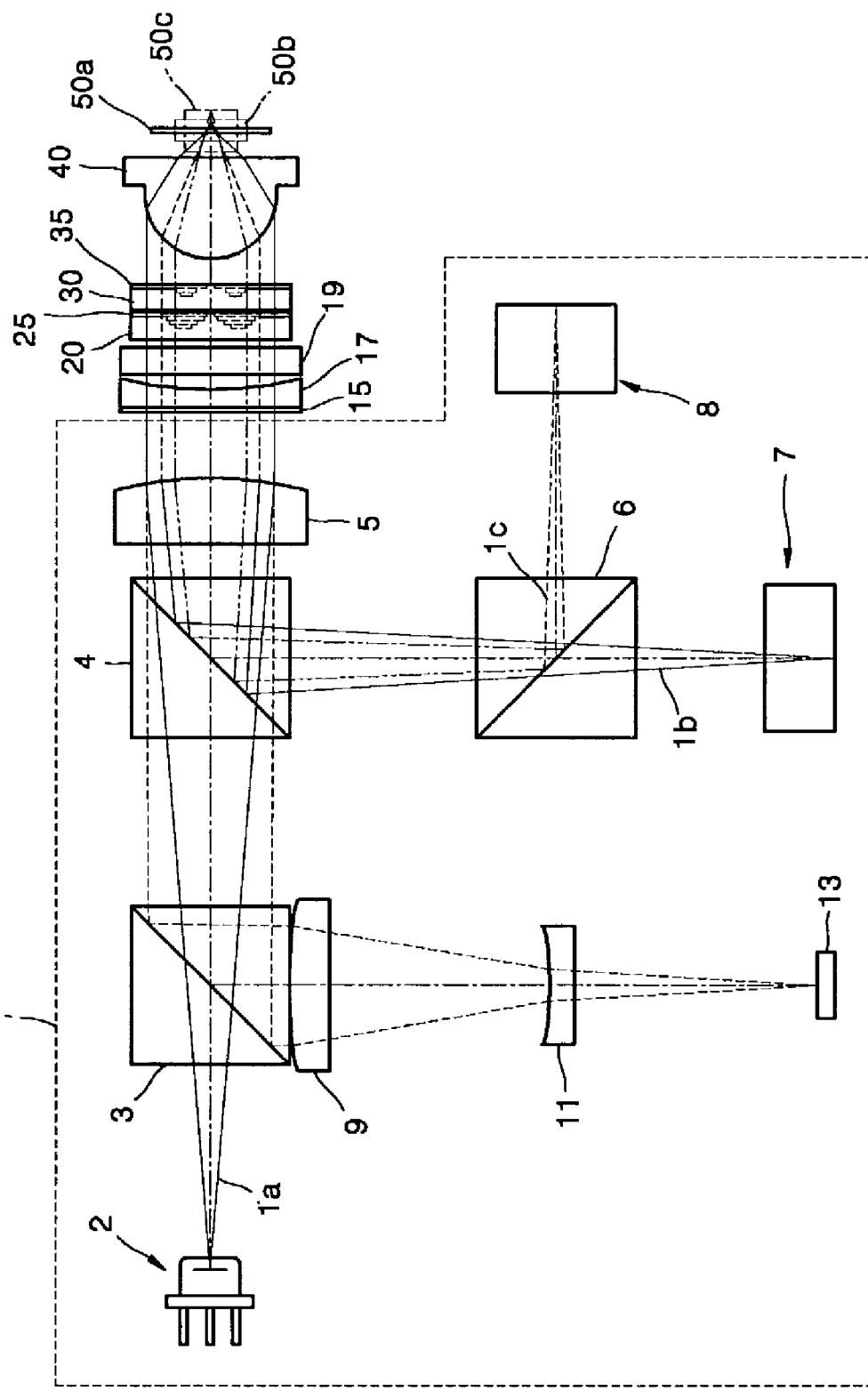

COMPATIBLE OPTICAL PICKUP HAVING DIFFRACTIVE DEVICE TO CORRECT CHROMATISM AND DIVERGENT LENS TO INCREASE WORKING DISTANCE

CROSS-REFERENCE TO RELATED APPLICATIONS

This application claims the benefit of Korean Application No. 2001-71094 filed Nov. 15, 2001, and Korean Application No. 2002-43282 filed Jul. 23, 2002, in the Korean Intellectual Property Office, the disclosures of which are incorporated herein by reference.

BACKGROUND OF THE INVENTION

1. Field of the Invention

The present invention relates to a compatible optical pickup which can record and/or reproduce information on/from a plurality of optical discs having different formats by using light beams having a plurality of wavelengths, and more particularly, to a compatible optical pickup to correct chromatism generated in an objective lens due to a change in an output of the light source when a record and/or reproduction mode is switched with respect to a high density optical disc.

2. Description of the Related Art

In an optical recording and/or reproducing apparatus to record or reproduce information with respect to an optical disc by using a light spot formed by an objective lens, a capacity to record is determined by a size S of the light spot. The size S of the light spot is proportional to a wavelength λ of a light beam and inversely proportional to numerical aperture (NA) of the objective lens, as shown by the following Equation 1:

$$S \propto \lambda/NA \quad \text{Equation 1}$$

Accordingly, to reduce the size S of a light spot focused on an optical disc to achieve high densification of the optical disc, it can be seen from Equation 1 that a short wavelength light source such as a light source emitting a blue-violet laser beam and an objective lens having an NA of 0.6 or more are necessary.

Thus, an optical pickup for a next generation DVD, so called an HD-DVD (high definition-digital versatile disc), that is currently under development, adopts a light source to emit the blue-violet laser beam and the objective lens having the NA of 0.6 or more, to obtain a higher information recording density than the information recording density of a conventional optical disc in a CD or a DVD family, by reducing the size S of the light spot formed on the optical disc.

However, an optical material such as glass and plastic used for the objective lens of a typical optical pickup exhibits a very sharp change in a refractive index in a range of a wavelength shorter than 650 nm.

Table 1 shows a change in the refractive index according to wavelength of M-BaCD5N manufactured by HOYA, which is used as a material for the glass to mold the objective lens.

TABLE 1

| Change in wavelength | Change in refractive index of HOYA's M-BaCD5N glass |
|---|---|
| 650 nm → 651 nm | 0.000038 |
| 405 nm → 406 nm | 0.000154 |

As can be seen from Table 1, the optical material shows a great change in the refractive index by about four times in a range of a blue-violet wavelength compared to a red wavelength used for the optical pickup for the DVD, with respect to a small change in wavelength by about 1 nm.

A sharp change in the refractive index of the optical material in a short wavelength mainly causes deterioration of performance, according to a defocus in a recordable high density optical pickup capable of repeatedly switching between recording and reproduction. That is, the optical pickup uses a recording optical power and a reproduction optical power which are different from each other. In general, if the output of a light source is increased, the wavelength of the light beam emitted from the light source becomes elongated. Chromatism generated in the objective lens due to a change in the wavelength according to a change in the optical power during a mode switch between recording and reproduction causes the defocus (i.e., defocus according to a mode hopping). Here, the mode hopping refers to a phenomenon in which the wavelength increases or decreases intermittently depending on conditions of the light source, for example, a change in temperature. When an input current is increased to increase the optical power, the temperature in the light source increases due to internal heat. Thus, the mode hopping occurs.

Although the defocus due to the change in the wavelength can be corrected by adjusting the objective lens by an actuator, because it takes a relatively long time to follow the change in the wavelength by driving the actuator, the quality of the reproduced and recorded signals is deteriorated during the above time. The defocus generated when the optical power is increased to record causes a lack of recording optical power while the defocus increases jitter when the optical power is decreased for reproduction.

That is, when the output of the light source is increased to record information on the optical disc, the wavelength of the light beam emitted from the light source is elongated to, for example, 406 nm, so that the light spot is defocused and recording cannot be performed appropriately until the actuator follows the defocus. When the output of the light source is decreased for reproduction, the wavelength of the light source is shortened to, for example, 405 nm. In this case, because the actuator is in a state of following the elongated wavelength, defocus is generated again. When the defocus is generated, jitter increases in a reproduction signal.

Thus, the optical pickup for a high density capable of recording in which recording and reproduction are repeated needs to have an optical system structure capable of restricting generation of chromatism or compensating therefore, even when the wavelength of the light beam emitted from the light source changes when recording and reproducing.

In the meantime, assuming that an inclination angle of the optical disc is q, the refractive index of the optical disc is n, a thickness of the optical disc is d, and the NA of the objective lens is NA, a coma aberration W31 generated by the inclination of the optical disc can be expressed by the following Equation 2:

$$W_{31} = -\frac{d}{2} \frac{n^2(n^2-1)\sin\theta\cos\theta}{(n^2-\sin^2\theta)^{5/2}} NA^3 \quad \text{Equation 2}$$

Here, the refractive index and the thickness of the optical disc correspond to those of the optical medium from each of light incident surfaces of the recording surface.

Considering Equation 2, to secure an allowance for the inclination of the optical disc, as NA the of the objective lens increases for the high density disc, the thickness of the optical disc needs to be reduced. Accordingly, the thickness of the DVD is reduced to 0.6 mm from 1.2 mm of the CD. The thickness of the HD-DVD may be reduced to 0.1 mm. Of course, the NA of the objective lens of the DVD is increased to 0.6 from 0.45 of the CD. In the case of the HD-DVD, the NA of the objective lens may increase to 0.85. Also, considering the recording capacity of the HD-DVD, the blue-violet light source is very likely to be adopted. In developing the optical disc having such a new specification, compatibility with a conventional optical disc is important.

For example, because a reflectance of a DVD-R or a CD-R of conventional optical discs which is recordable only one time is drastically lowered according to the wavelength, use of the light source of a wavelength of 650 nm and 780 nm is necessary. Thus, considering the compatibility with the DVD-R and/or the CD-R, a compatible optical pickup to record and/or reproduce the HD-DVD needs to adopt two or three light sources having different wavelengths.

Here, the compatible optical pickup adopting a plurality of light sources having different wavelengths may include a single objective lens considering various merits such as a size of an apparatus, easiness in assembly, and cost.

However, design and manufacturing of the objective lens having a high NA of 0.85 into one unit requires high technology and it is difficult to have a working distance lengthy like the objective lens for the DVD, while maintaining the high NA. In the field of the present technology, the objective lens is typically designed to have the working distance of 0.6 mm with respect to the blue-violet light source and the HD-DVD having a thickness of 0.1 mm. When the light beam emitted from the light source for the DVD and the light source for the CD is focused by the objective lens having the working distance of 0.6 mm with respect to the HD-DVD and forms the light spot on the DVD and the CD, the working distance is 0.32 mm and −0.03 mm, respectively, which means that the CD collides with the objective lens.

When the light beam emitted from the light source for the CD is input to the objective lens in a form of a divergent light beam by reducing a distance between the light source for the CD and a collimating lens, the working distance can be secured. However, in this case, because the optical system is a finite optical system, an aberration characteristic, according to the movement of the actuator in a radial direction, is sharply deteriorated which is not desirable.

In summary, a recordable high density optical pickup to repeatedly record and reproduce by using the light source having a shorter wavelength than the red wavelength needs an optical system structure which can restrict or compensate for the defocus during the switching between recording and reproduction modes. Also, the high density optical pickup needs to have lengthy working distance with respect to the light beam for the DVD and/or the CD considering the compatibility with a relatively low density DVD and/or CD.

SUMMARY OF THE INVENTION

In accordance with an aspect of the present invention, there is provided a compatible optical pickup to reduce defocus according to a mode hopping of a short wavelength light source and adopting a short wavelength light source and a long wavelength light source by which, when a high density and a low density optical disc, the low density optical disc having a relatively large thickness, are compatible, a sufficient working distance is secured so that an objective lens and the low density optical disc do not collide with each other with respect to a light beam emitted from the long wavelength light source.

In accordance with an aspect of the present invention, there is provided a compatible optical pickup, including an optical unit to emit a short wavelength light beam for a high density optical disc and a long wavelength light beam for a low density optical disc, and to receive and detect light beams reflected by the high density optical disc and the low density optical disc; an objective lens to form a light spot on the high density optical disc and the low density optical disc by focusing incident short wavelength and long wavelength light beams; a diffractive device to correct chromatism according to a change in a wavelength of the short wavelength light beam by diffracting the short wavelength light beam from the optical unit; and a divergent lens to increase a working distance with respect to the low density optical disc by refracting the long wavelength light beam from the optical unit toward the objective lens.

In accordance with an aspect of the present invention, the short wavelength light beam and the long wavelength light beam are polarized orthogonally to each other, and the diffractive device is a polarizing holographic device which diffracts the short wavelength light beam having one polarization and transmits unchanged the long wavelength light beam having a different polarization orthogonal to the polarization of the short wavelength light beam.

In accordance with an aspect of the present invention, the polarizing holographic device is of a blazed type to improve an efficiency of a first diffraction with respect to the short wavelength light beam.

In accordance with an aspect of the present invention, the low density optical disc includes first and second low density optical discs having different recording densities and thicknesses, and the long wavelength light beam includes a first long wavelength light beam having a wavelength of $\lambda 1$ for the first low density optical disc and a second long wavelength light beam having a wavelength of $\lambda 2$ for the second low density optical disc.

In accordance with an aspect of the present invention, the low density optical disc includes first and second low density optical discs having different recording densities and thicknesses, the long wavelength light beam includes a first long wavelength light beam having a wavelength of $\lambda 1$ for the first low density optical disc and a second long wavelength light beam having a wavelength of $\lambda 2$ for the second low density optical disc, the diffractive device is a holographic device where a pattern having a stepped structure is formed, and when refractive indices of an optical medium forming the holographic device are n11 and n22 with respect to the wavelengths $\lambda 1$ and $\lambda 2$ of the first and second long wavelength light beams, respectively, a size d of a step of the pattern satisfies the following equations:

$$(n11-n0')d=g\lambda 1, \text{ and}$$

$$(n22-n0'')d=h\lambda 2,$$

where g and h are numbers within a range of an integer ±0.07, and n0' and n0'' are refractive indices of an air portion with respect to the wavelengths of $\lambda 1$ and $\lambda 2$, respectively.

In accordance with an aspect of the present invention, a blazed type pattern is formed in the holographic device.

In accordance with an aspect of the present invention, the first and second low density optical discs are in a DVD family and a CD family, respectively, the high density optical disc has a thickness thinner than a thickness of the first low density optical disc, and the high density optical disc has a thickness of about 0.1 mm.

In accordance with an aspect of the present invention, the objective lens has an NA of at least 0.7.

In accordance with an aspect of the present invention, a working distance of the objective lens is not more than 0.7 mm.

In accordance with an aspect of the present invention, the compatible optical pickup further includes first and second phase correctors to correct an aberration generated during use of the first and second low density optical discs by generating a change in a phase difference with respect to the first and second long wavelength light beams.

In accordance with an aspect of the present invention, each of the first and second phase correctors has phase delay areas, when phase delays of the short wavelength light beam having a wavelength of $\lambda$ and the second long wavelength light beam having the wavelength of $\lambda 2$ passing through one of the phase delay areas of the first phase corrector are a and a' respectively, and phase delays of the short wavelength light beam and the second long wavelength light beam passing through another one of the phase delay areas of the first phase corrector adjacent to the one of the phase delay areas of the first phase corrector are b and b', respectively, the first phase corrector satisfies the following equations:

$(a-b)=l\lambda$, and $(a'-b')=m\lambda 2$, where l and m are numbers within a range of an integer ±0.07, and when phase delays of the short wavelength light beam having the wavelength of $\lambda$ and the first long wavelength light beam having the wavelength of $\lambda 1$ passing through one of the phase delay areas of the second phase corrector are c and c', respectively, and phase delays of the short wavelength light beam and the first long wavelength light beam passing through another one of the phase delay areas of the second phase corrector adjacent to the one of the phase delay areas of the second phase corrector are d and d', respectively, the second phase corrector satisfies the following equations:

$(c-d)=p\lambda$, and $(c'-d')=q\lambda 1$, where p and q are numbers within a range of an integer ±0.07.

In accordance with an aspect of the present invention, a pattern having a stepped structure is formed in the first phase corrector, a step of the pattern corresponds to the phase delay areas associated with the first phase corrector, and when refractive indices of an optical medium forming the first phase corrector with respect to the wavelengths of $\lambda$ and $\lambda 2$ are n and n2, respectively, a size s1 of the step of the pattern satisfies the following equations:

$(n-n0)s1=l\lambda$, and $(n2-n0'')s1=m\lambda 2$, where n0' and n0'' are refractive indices of an air portion with respect to the wavelengths of $\lambda$ and $\lambda 2$, respectively.

In accordance with an aspect of the present invention, a pattern having a stepped structure is formed in the second phase corrector, a step of the pattern corresponds to the phase delay areas associated with the second phase corrector, and when refractive indices of an optical medium forming the second phase corrector with respect to the wavelengths of $\lambda$ and $\lambda 1$ are n' and n1', respectively, a size s2 of the step of the pattern satisfies the following equations:

$(n'-n0)s2=p\lambda$, and $(n1'-n0')s2=q\lambda 1$, where n0 and n0' are refractive indices of an air portion with respect to the wavelengths of $\lambda$ and $\lambda 1$, respectively.

In accordance with an aspect of the present invention, the compatible optical pickup further includes an aperture filter to change an effective NA of the objective lens with respect to one of the first and second long wavelength light beams to record and/or reproduce information to/from one of the first and second low density optical discs.

In accordance with an aspect of the present invention, the aperture filter is one of a wavelength selective coating member and a holographic diffractive member which is formed to allow a light beam incident at a central portion of the aperture filter to proceed, unchanged, and to selectively block a light beam incident outside the central portion according to a wavelength of the incident light beam.

In accordance with an aspect of the present invention, the aperture filter is integrally formed with one of the first and second phase correctors.

In accordance with an aspect of the present invention, the short wavelength light beam is in a blue-violet wavelength area, the first long wavelength light beam is in a red wavelength area, and the second long wavelength light beam is in an infrared wavelength area, wherein a wavelength $\lambda$ of the short wavelength light beam is in a range of 400-410 nm, the wavelength $\lambda 1$ is one of 635 nm and 650 nm, and the wavelength $\lambda 2$ is 780 nm.

In accordance with an aspect of the present invention, when the short wavelength light beam output from the optical unit and incident on the diffractive device is a parallel beam, the divergent lens offsets an optical power applied by the diffractive device to the short wavelength light beam and makes the short wavelength light beam be incident on the objective lens as a parallel beam.

In accordance with an aspect of the present invention, the diffractive device and the divergent lens are integrally driven with the objective lens.

In accordance with an aspect of the present invention, the compatible optical pickup further includes a wave plate to improve an efficiency of light with respect to the short wavelength light beam.

In accordance with an aspect of the present invention, there is provided a compatible optical pickup, including an optical unit emitting a short wavelength light beam corresponding to a high density optical disc and a long wavelength light beam corresponding to a low density optical disc; an objective lens forming a light spot on the high density optical disc and the low density optical disc; a diffractive device diffracting the short wavelength light beam to correct chromatism according to a change in a wavelength of the short wavelength light beam; and a divergent lens refracting the long wavelength light beam toward the objective lens to increase a working distance with respect to the low density optical disc.

In accordance with an aspect of the present invention, there is provided a compatible optical pickup, including an optical unit emitting a first wavelength light beam corresponding to a high density optical disc and a second wavelength light beam corresponding to a low density optical disc; a diffractive device diffracting the first wavelength light beam to correct chromatism according to a change in a wavelength of the first wavelength light beam; and a divergent lens refracting the second wavelength light beam to increase a working distance with respect to the low density optical disc.

In accordance with an aspect of the present invention, there is provided a compatible optical pickup, including an optical unit emitting a first light beam having a first wavelength, a second light beam having a second wavelength different from the first wavelength, and a third light beam having a third wavelength different from the first wavelength and the second wavelength; a first phase corrector generating a change in a phase difference with respect to the first light beam having the first wavelength and transmitting unchanged the second light beam having the second wavelength and the third light beam having the third wavelength to correct an aberration generated during recording and/or reproduction of a first low density optical disc; and a second phase corrector generating a change in a phase difference with respect to the second light beam having the second wavelength and transmitting unchanged the first light beam having the first wavelength and the third light beam having the third wavelength to correct an aberration generated during recording and/or reproduction of a second low density optical disc.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other objects and advantages of the invention will become apparent and more readily appreciated from the following description of the embodiments, taken in conjunction with the accompanying drawings of which:

FIG. 6 is a view illustrating the optical structure of the compatible optical pickup according to an aspect of the present invention;

DETAILED DESCRIPTION OF THE INVENTION

Figure 1:
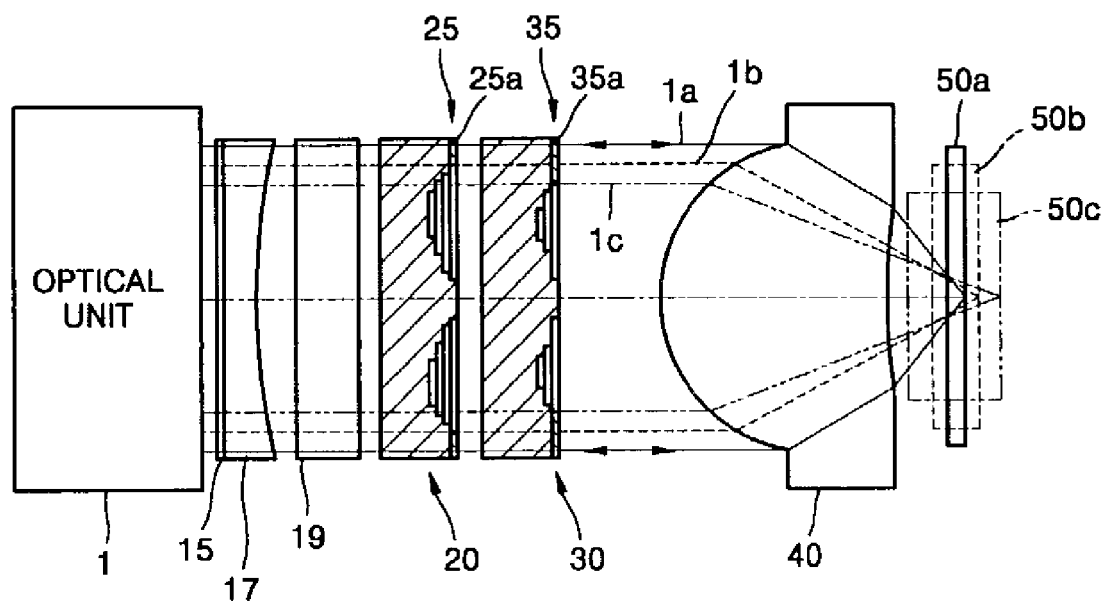
FIG. 1 is a view illustrating a compatible optical pickup according to an aspect of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Referring to FIG. 1, a compatible optical pickup, according to an aspect of the present invention includes an optical unit 1, an objective lens 40 to focus a short wavelength light beam and a long wavelength light beam emitted from the optical unit 1 and to form light spots on a high density optical disc 50a and low density optical discs 50b and 50c, and a diffractive device 15 to diffract the short wavelength light beam emitted from the optical unit 1. A divergent lens 17 is provided in the optical pickup to increase a working distance with respect to at least one of the low density optical discs 50b and 50c by refracting the long wavelength light beam proceeding toward the objective lens 40 from the optical unit 1.

The optical unit 1 emits a short wavelength light beam 1a suitable for the high density optical disc 50a and at least one of long wavelength light beams 1b and 1c suitable for at least one of the low density optical discs 50b and 50c, so that recording and/or reproduction can be performed compatibly with the high density optical disc 50a and the at least one of the low density optical discs 50b and 50c. The optical unit 1 receives light beams reflected by the high density optical disc 50a and the low density optical discs 50b and 50c to detect an information signal and an error signal.

The high density optical disc 50a can have a thickness thinner than a DVD, for example, a thickness for an optical disc in a next generation DVD family having a capacity of 20 GB or more (hereinafter, referred to as "HD-DVD"). The first and second low density optical discs 50b and 50c may have different recording densities and thicknesses. When the high density optical disc 50a is the HD-DVD, the first low density optical disc may be an optical disc in a DVD family (hereinafter, referred to as "DVD") and the second low density optical disc 50c may be an optical disc in a CD family (hereinafter, referred to as "CD").

When the compatible optical pickup, according to an aspect of the present invention, records and/or reproduces three kinds of optical discs having different recording densities, that is, the high density optical disc 50a, and the first and second low density optical discs 50b and 50c, the long wavelength light beams 1b and 1c become the first long wavelength light beam 1b having a wavelength of λ1 suitable for the first low density optical disc 50b and the second long wavelength light beam 1c having a wavelength of λ2 suitable for the second low density optical disc 50c.

When the compatible optical pickup, according to an aspect of the present invention, is provided to compatibly record and/or reproduce the CD, the DVD, and the HD-DVD, the short wavelength light beam 1a may be a light beam having a wavelength in a range of a blue-violet wavelength area, for example, in a range between 400-410 nm, the first long wavelength light beam 1b is a light beam having a wavelength in a range of a red wavelength area, for example, a wavelength of 635 or 650 nm, and the second long wavelength light beam 1c is the light beam having a wavelength in a range of an infrared area, for example, about 780 nm.

The objective lens 40 has an NA of 0.7 or more, specifically, 0.85, to record and/or reproduce the high density optical disc 50a. The objective lens 40 can have a working distance of not more than 0.7 mm because the working distance can be increased by a divergent lens 17 when the first and/or second low density optical discs 50b and 50c are adopted having the thickness greater than the thickness of the high density optical disc 50a. As a result, the objective lens 40 is prevented from colliding against the first and second low density optical discs 50b and 50c.

The optical unit 1 can be provided to emit the short wavelength light beam 1a and the first and second long wavelength light beams 1b and 1c which are perpendicularly polarized. Here, for example, the short wavelength light beam 1a has a P polarization while the first and second long wavelength light beams 1b and 1c have an S polarization.

The diffractive device 15, as a polarization type diffractive device, may include a polarizing holographic device which diffracts the short wavelength light beam 1a having one polarization. The diffractive device 15 transmits the first and second long wavelength light beams 1b and 1c having another polarization perpendicular to the polarization of the short wavelength beam 1a.

The polarizing holographic device, as it is well known, if it is a transmission type, diffracts a light beam having a first polarization and transmits the light beam having a second polarization perpendicular to the first polarization without diffracting the light beam.

In an aspect of the present invention, the polarizing holographic device may be formed of a blazed type so that an efficiency of diffraction is improved with respect to a first diffraction light beam used as an effective light beam to the short wavelength light beam 1a. Here, the blazed type polarizing holographic device has a structure similar to that of a blazed type non-polarizing holographic device shown in FIG. 2 which is described later. The blazed type polarizing holographic device can be formed of an anisotropic optical material having different refractive indices according to the polarization.

Alternatively, the diffractive device 15 may be formed of a plurality of phase delay areas provided to generate a change in a phase only to the short wavelength light beam 1a regardless of the polarization of an incident light beam. The diffractive device 15 may have a structure in which the phase delay areas are periodically repeated to diffract the short wavelength light beam 1a only. Here, the diffractive device 15 may be of the blazed type and can improve the optical efficiency of a first diffracted light beam with respect to the short wavelength light beam 1a.

The phase delay areas may be provided such that a phase difference between one phase delay area and an adjacent phase delay area with respect to the first and second long wavelength light beams 1b and 1c, approximately, is an integral multiple of the wavelength λ1 of the first long wavelength light beam 1b and the wavelength λ2 of the second long wavelength light beam 1c.

That is, assuming that amounts of phase delay when the first and second long wavelength light beams 1b and 1c pass through one phase delay area of the diffractive device 15 are i and i', and amounts of phase delay when the first and second long wavelength light beams 1b and 1c pass through an adjacent phase delay area of the diffractive device 15 are j and j', the phase difference between the adjacent phase delay areas may satisfy the following Equation 3:

$$(i-j)=g\lambda 1$$

$$(i'-j')=h\lambda 2 \quad \text{Equation 3}$$

Here, g and h are numbers within a range of an integer ±0.07, specifically, a range of an integer ±0.05.

In this case, because the first and second long wavelength light beams 1b and 1c can transmit the diffractive device 15 without a phase change, the first and second long wavelength light beams 1b and 1c are not diffracted. In contrast, the phase change is generated at the diffractive device 15 with respect to the short wavelength light beam 1a, and the phase delay areas diffract the short wavelength light beam 1a due to a periodic repetitive structure of the short wavelength light beam 1a.

Figure 2:
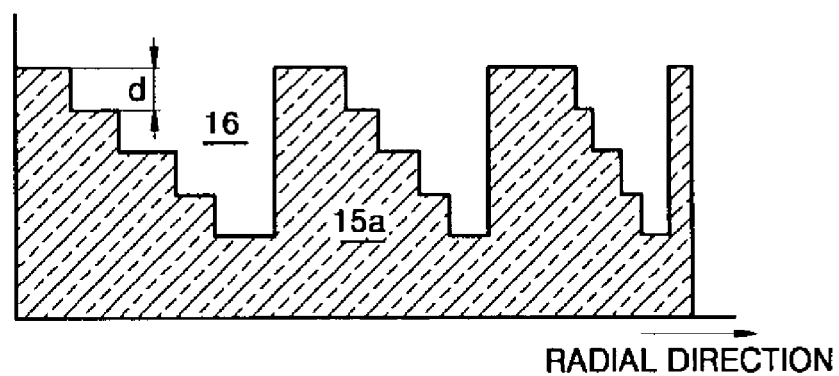
FIG. 2 is a view illustrating a non-polarization type diffractive device adopted in the compatible optical pickup device according to an aspect of the present invention.

In an aspect of the present invention, the diffractive device 15 as a non-polarization type diffractive device, as shown in FIG. 2, can have a holographic device in which a pattern having a stepped structure so that the short wavelength light beam 1a can be diffracted is periodically formed at least one side of a plate type optical medium. FIG. 2 shows an example of a blazed type holographic device in which the diffractive device 15 has a 4-step structure. In FIG. 2, reference numeral 15a denotes an optical medium portion such as glass used to manufacture the diffractive device 15, and reference numeral 16 denotes an air portion where the optical medium is removed to form a pattern having a stepped structure. Also, reference letter d denotes a size of a step.

Here, the size d of the step of the pattern of the diffractive device 15 may be formed to have a size corresponding to approximately an integral multiple of the wavelengths λ1 and λ2 of the first and second long wavelength light beams 1b and 1c, satisfying the conditions of Equation 3, in which the first and second long wavelength light beams 1b and 1c are transmitted unchanged. Here, the step of the pattern corresponds to the above-mentioned phase delay area.

The size d of the step of the pattern of the diffractive device 15 satisfies the following Equation 4 corresponding to Equation 3:

$$(n11-n0')d=g\lambda 1$$

$$(n22-n0'')d=h\lambda 2 \quad \text{Equation 4}$$

Here, n11 and n22 are refractive indices of the first and second long wavelength light beams 1b and 1c in an optical medium forming the diffractive device 15 with respect to the wavelengths of λ1 and λ2, respectively. Further, n0' and n0" are refractive indices of the first and second long wavelength light beams 1b and 1c in the air portion with respect to the wavelengths of λ1 and λ2, respectively.

Figure 3:
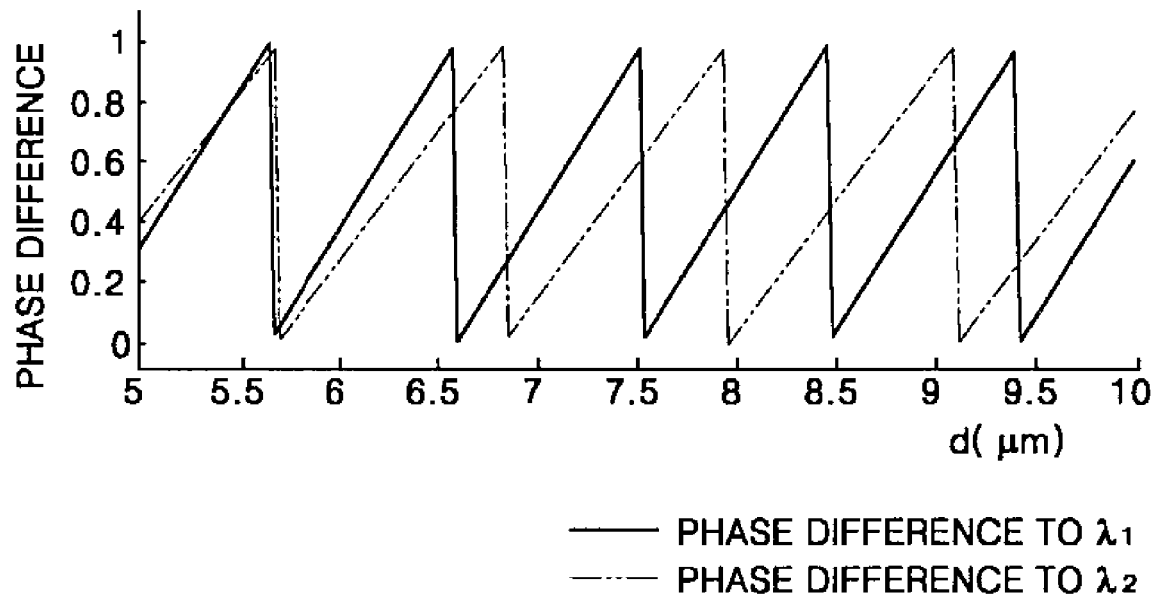
FIG. 3 is a graph showing a phase difference between a wavelength λ1 of a first long wavelength light beam and a wavelength λ2 of a second long wavelength light beam according to a size d of a pattern step when M-LaC130_HOYA is used as an optical medium of the non-polarization type diffractive device of FIG. 2.

FIG. 3 is a graph showing a phase difference between the wavelength λ1 of the first long wavelength light beam 1b and the wavelength λ2 of the second long wavelength light beam 1c according to the size d of the step when M-LaC130_HOYA is used as the optical medium of the diffractive device 15. The graph of FIG. 3 is obtained when the high density optical disc 50a and the first and second low density optical disc 50b and 50c are the HD-DVD, the DVD, and the CD, respectively, the wavelength λ of the short wavelength light beam 1a is 400 nm, and the wavelengths λ1 and λ2 of the first and second long wavelength light beams 1b and 1c are 650 nm and 780 nm, respectively. Here, the refractive indices of M-LaC130_HOYA to the wavelengths of 400 nm, 650 nm, and 780 nm are 1.715566, 1.689858, and 1.684657, respectively.

Referring to FIG. 3, when a stepped pattern having a step size d of 5.66 μm is formed by using M-LaC130_HOYA as the optical medium, a phase difference of 0.007 λ1 is generated close to an integral multiple with respect to the wavelength λ1 of the first long wavelength light beam 1b for the DVD, a phase difference of 0.032 λ2 is generated close to an integral multiple with respect to the wavelength λ2 of the second long wavelength light beam 1c for the CD, and a phase difference of 0.14λ generated with respect to the wavelength λ of the short wavelength light beam 1a for the HD-DVD are generated.

Thus, the diffractive device 15 satisfying Equation 4 can be obtained by periodically forming a pattern having a plurality of steps having a step size d of 5.66 μm by using M-LaC130_HOYA as the optical medium.

As can be seen from a grating equation, the polarization or non-polarization diffractive device 15 has a property that a diffraction angle of a diffracted light beam of the same order increases as the wavelength of an incident light increases, and accordingly a focal length is reduced as the wavelength of the incident light increases.

Thus, when the diffractive device 15 is provided, the wavelength of the short wavelength light beam 1a increases so that the focal length of the objective lens 40 increases while the focal length at the diffractive device 15 is reduced. Thus, the increase and decrease in the focal length are offset so that a defocus due to the mode hopping during the recording and/or reproduction mode switching, with respect to the high density optical disc 50a, can be reduced.

Also, when the diffractive device 15 is provided, defocus due to the mode hopping during the recording and/or reproduction mode switching with respect to the short wavelength light beam 1a can be reduced. The long wavelength light beams 1b and 1c can proceed without being affected by the diffractive device 15.

The divergent lens 17 can be arranged on the optical path between the diffractive device 15 and the objective lens 40. The divergent lens 17 refracts the first and second long wavelength light beams 1b and 1c proceeding toward the objective lens 40 from the optical unit 1 to be incident upon the objective lens 40 as divergent light beams. When the divergent lens 17 is adopted and the second long wavelength light beam 1c is focused by the objective lens 40 having an NA of 0.85 and a working distance of 0.6 mm with respect to the high density optical disc 50a, that is, the HD-DVD, a working distance of 0.23 mm, for example, to the second low density optical disc 50c, that is, the CD, can be obtained. Here, when the objective lens 40 having a working distance of 0.6 mm is used, no problem is generated with respect to the DVD.

When the divergent lens 17 is provided at the entrance pupil side of the objective lens 40, even when the objective lens 40 having a normal working distance (for example, 0.6 mm) is used for the HD-DVD, a sufficient working distance not only for the DVD but also the CD can be obtained. Thus, during the recording and/or reproduction of the CD, the objective lens 40 is prevented from colliding against the optical disc.

In the meantime, when no divergent lens 17 is provided, the short wavelength light beam 1a diffracted by the diffractive device 15 is incident on the objective lens 40 as a converging light beam by the diffraction angle. However, when the divergent lens 17 is arranged at an entrance pupil side of the objective lens 40, the short wavelength light beam 1a diffracted by the diffractive device 15 is refracted by the divergent lens 17 to be incident on the objective lens 40 as an approximately parallel beam. As shown in FIG. 1, when the short wavelength light beam 1a, incident on the diffractive device 15, is a parallel beam, the divergent lens 17 compensates for the optical power applied to the short wavelength light beam 1a by the diffractive device 15.

According to an aspect of the present invention, the diffractive device 15 and the divergent lens 17 hardly have optical power with respect to the short wavelength light beam 1a for the high density optical disc 50a. For this purpose, the diffractive device 15 and the divergent lens 17 may be driven integrally with the objective lens 40. That is, the diffractive device 15 and the divergent lens 17 may be installed at a bobbin of an actuator (not shown) where the objective lens is installed.

The compatible optical pickup, according to an aspect of the present invention, includes a wave plate 19 to improve an efficiency of the short wavelength light beam 1a for the high density optical disc 50a. When the wave plate 19 is arranged between the diffractive device 15 and the objective lens 40, as shown in FIG. 1, the wave plate 19 works as a quarter wave plate with respect to the short wavelength light beam 1a, while the wave plate 19 works as a half wave plate with respect to the first and second long wavelength light beams 1b and 1c.

Figure 8:
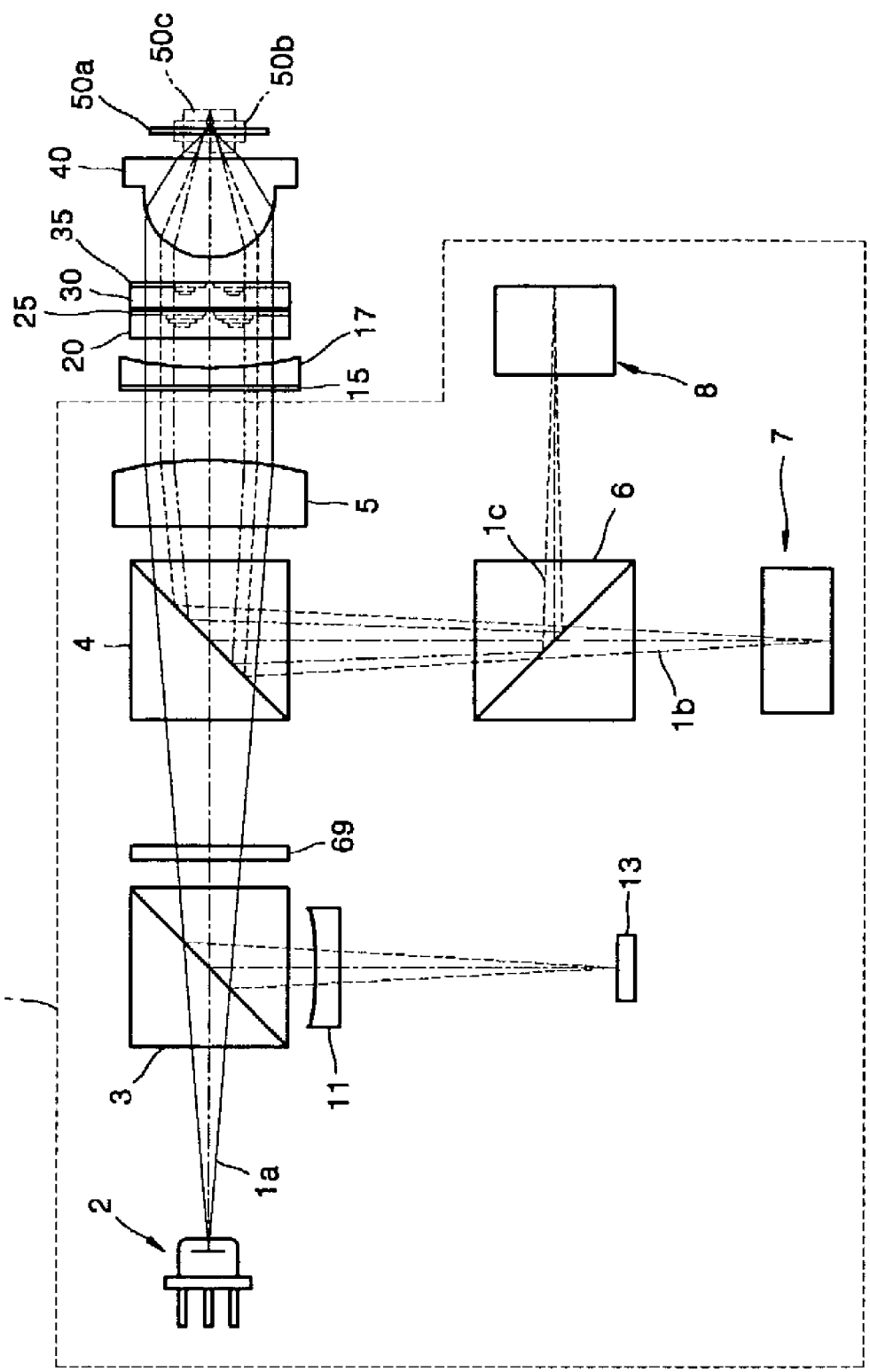
FIG. 8 is a view illustrating the optical structure of the compatible optical pickup according to an aspect of the present invention.

Here, when a polarizing holographic device is provided as the diffractive device 15, the wave plate 19 may be arranged between the diffractive device 15 and the objective lens 40 as shown in FIG. 1. When the non-polarization diffractive device 15 is provided as the diffractive device 15 as shown in FIG. 8, which will be described later, a position of a wave plate 69 of FIG. 8 may be different from the position of the wave plate 19 of FIG. 1.

In the meantime, in a case in which the first and second low density optical discs 50b and 50c have thicknesses different from that of the high density optical disc 50a, and when the light spot is formed on the first low density optical disc 50b by focusing the first long wavelength light beam 1b using the objective lens 40, spherical aberration is generated due to a difference in the thickness between the high density optical disc 50a and the first low density optical disc 50b. Likewise, when the light spot is formed on the second low density optical disc 50c by focusing the second long wavelength light beam 1c using the objective lens 40, the spherical aberration is generated due to a difference in the thickness between the high density optical disc 50a and the second low density optical disc 50c. Also, when the first and second long wavelength light beams 1b and 1c are focused by the objective lens 40, chromatism is generated due to a difference in the wavelength from the short wavelength light beam 1a.

Thus, when the high density optical disc 50a and the first and second low density optical discs 50b and 50c are compatibly recorded and/or reproduced, the compatible optical pickup, according to an aspect of the present invention, may provide first and second phase correctors 20 and 30 to correct aberration when the first and second low density optical discs 50b and 50c are adopted.

The first phase corrector 20 corrects spherical aberration and/or chromatism generated in the first long wavelength light beam 1b during the recording and/or the reproduction of the first low density optical disc 50b. The second phase corrector 30 corrects the spherical aberration and/or chromatism generated in the second long wavelength light beam 1c during the recording and/or the reproduction of the second low density optical disc 50c.

The first phase corrector 20 has a plurality of phase delay areas provided to generate a change in a phase difference only for the first long wavelength light beam 1b to correct the aberration generated during the recording and/or the reproduction of the first low density optical disc 50b. The phase delay areas may be provided such that a phase difference between one phase delay area and another phase delay area adjacent thereto, with respect to the short wavelength light beam 1a and the second long wavelength light beam 1c, is approximately an integral multiple of the wavelength $\lambda$ of the short wavelength light beam 1a and the wavelength $\lambda 2$ of the second long wavelength light beam 1c. Thus, a change in the phase difference is generated only in the light beam having a particular wavelength by a principle similar to a case of the non-polarization diffractive device 15 described with reference to FIG. 2.

That is, assuming that amounts of phase delay when the short wavelength light beam 1a and the second long wavelength light beam 1c pass through one phase delay area of the first phase corrector 20 are a and a', and amounts of phase delay when the short wavelength light beam 1a and the second long wavelength light beam 1c pass through an adjacent phase delay area of the first phase corrector 20 are b and b', the phase difference between the adjacent phase delay areas may satisfy the following Equation 5:

$$(a-b)=l\lambda$$
$$(a'-b')=m\lambda 2 \qquad \text{Equation 5}$$

Here, l and m are numbers within a range of an integer ±0.07, for instance, a range of an integer ±0.05.

In this case, because the first phase corrector 20 generates a change in phase with respect to the first long wavelength light beam 1b, the short wavelength light beam 1a and the second long wavelength light beam 1c are transmitted without the phase change.

Similarly, the second phase corrector 30 has a plurality of phase delay areas provided to generate a change in a phase difference only for the second long wavelength light beam 1c to correct the aberration generated during the recording and/or the reproduction of the second low density optical disc 50c. The phase delay areas may be provided such that a phase difference between one phase delay area and another phase delay area adjacent thereto, with respect to the short wavelength light beam 1a and the first long wavelength light beam 1b, is approximately an integral multiple of the wavelength $\lambda$ of the short wavelength light beam 1a and the wavelength $\lambda 1$ of the first long wavelength light beam 1b. That is, assuming that amounts of phase delay when the short wavelength light beam 1a and the first long wavelength light beam 1b pass through one phase delay area of the second phase corrector 30 are c and c', and amounts of phase delay when the short wavelength light beam 1a and the first long wavelength light beam 1b pass through an adjacent phase delay area of the second phase corrector 30 are d and d', the phase difference between the adjacent phase delay areas may satisfy the following Equation 6:

$$(c-d)=p\lambda$$

$$(c'-d')=q\lambda 1 \qquad \text{Equation 6}$$

Here, p and q are numbers within a range of an integer ±0.07, for instance, a range of an integer ±0.05.

In this case, the second phase corrector 30 generates a change in phase with respect to the second long wavelength light beam 1c and transmits the short wavelength light beam 1a and the first long wavelength light beam 1b without the phase change.

Figure 4:
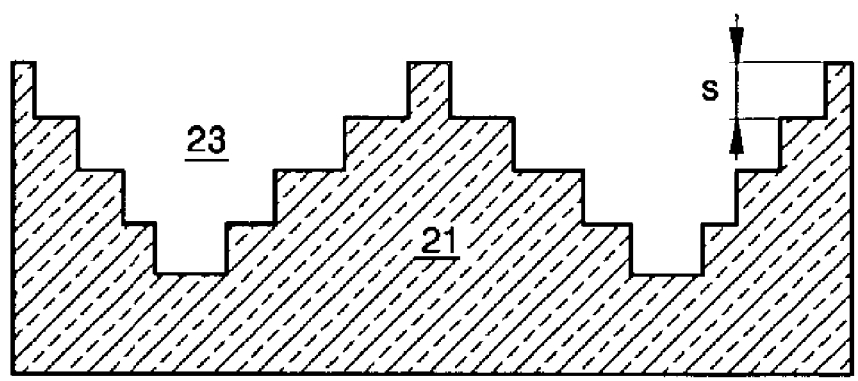
FIG. 4 is a view illustrating first and second phase correctors adopted in the compatible optical pickup according to an aspect of the present invention.

The first and second phase correctors 20 and 30, as shown in FIG. 4, may have a structure in which a pattern having a step is formed in at least one side of a plate type optical medium to generate a change in a phase difference to correct aberration generated when adopting the first and second low density optical discs 50b and 50c. In FIG. 4, reference 21 denotes an optical medium portion such as glass, used to manufacture the first and second phase correctors 20 and 30, reference numeral 23 denotes an air portion where the optical medium is removed by forming a pattern having the step, and reference letter s denotes a size of the step.

Here, sizes s1 and s2 of a step of a pattern of each of the first and second phase correctors 20 and 30, to satisfy the conditions of Equations 5 and 6, may be formed to approximately correspond to an integral multiple of the two wavelengths such that the first and second phase correctors 20 and 30 work to generate a change in a phase difference only in the light beam having one wavelength and transmit the light beams having the other two wavelengths nearly unchanged. Here, each step of the patterns correspond to the above phase delay area.

That is, the size s1 of the step of the pattern of the first phase corrector 20 may satisfy the following Equation 7 corresponding to Equation 5:

$$(n-n0)s1=l\lambda$$

$$(n2-n0'')s1=m\lambda 2 \qquad \text{Equation 7}$$

Here, n and n2 are refractive indices of the short wavelength light beam 1a and the second long wavelength light beam 1c in the optical medium forming the first phase corrector 20 with respect to the wavelengths of λ and λ2, respectively. Further, n0 and n0'' are refractive indices of the short wavelength light beam 1a and the second long wavelength light beam 1c in the air portion with respect to the wavelengths of λ and λ2, respectively.

Also, the size s2 of the step of the pattern of the second phase corrector 30 may satisfy the following Equation 8 corresponding to Equation 6:

$$(n'-n0)s2=p\lambda$$

$$(n1'-n0')s2=q\lambda 1 \qquad \text{Equation 8}$$

Here, n' and n1' are refractive indices of the short wavelength light beam 1a and the first long wavelength light beam 1b in the optical medium forming the second phase corrector 30 with respect to the wavelengths of λ and λ1, respectively. Further, n0 and n0' are refractive indices of the short wavelength light beam 1a and the first long wavelength light beam 1b in the air portion with respect to the wavelengths of λ and λ1, respectively.

Figure 5:
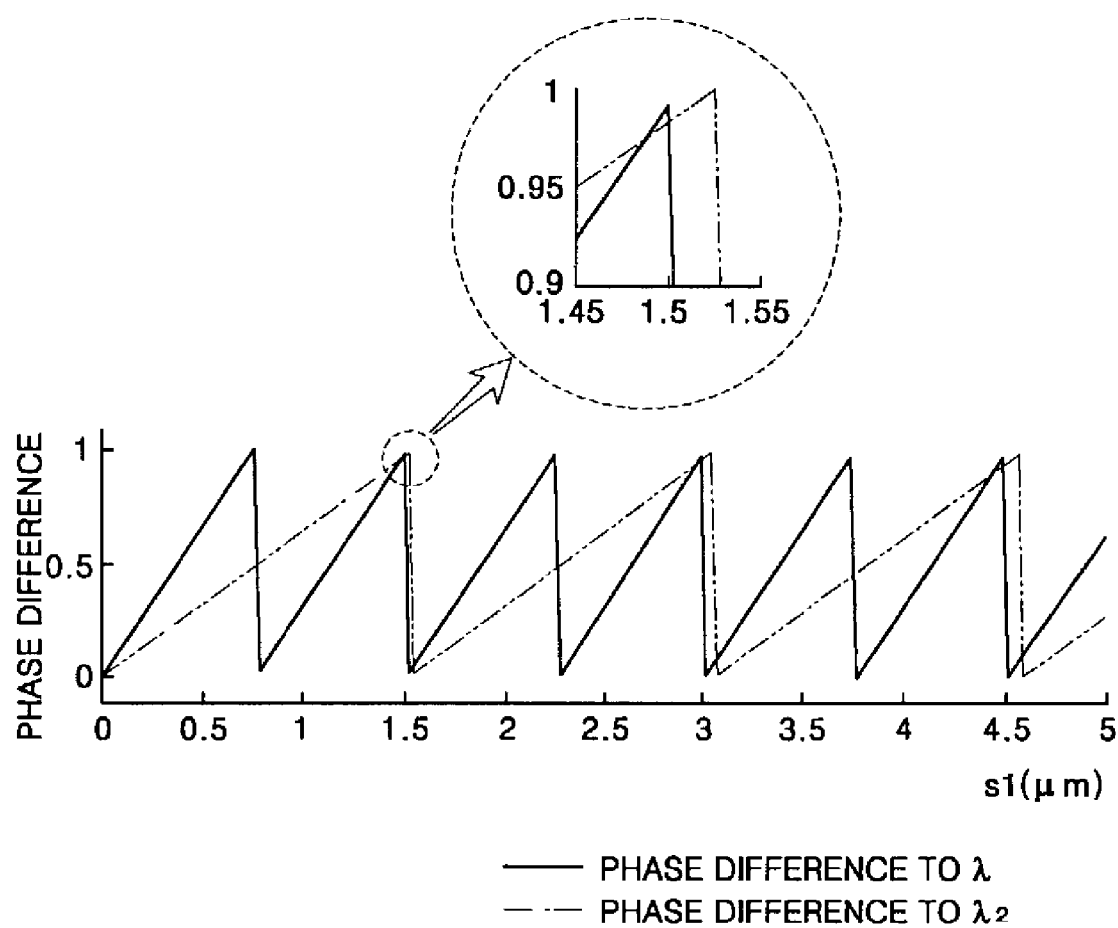
FIG. 5 is a graph showing a phase difference between a wavelength λ of a short wavelength light beam for an HD-DVD and the wavelength λ2 of the second long wavelength light beam for a CD according to a size s1 of a pattern step when BK7 is used as the optical medium of the first phase corrector.

FIG. 5 is a graph showing a phase difference between the wavelength λ of the short wavelength light beam 1a for the HD-DVD and the wavelength λ2 of the second long wavelength light beam 1c for the CD according to the size s1 of the step when BK7 is used as the optical medium of the first phase corrector 20. The graph of FIG. 5 is obtained when the high density optical disc 50a and the first and second low density optical disc 50b and 50c are the HD-DVD, the DVD, and the CD, respectively, the wavelength λ of the short wavelength light beam 1a is 400 nm, and the wavelengths λ1 and λ2 of the first and second long wavelength light beams 1b and 1c are 650 nm and 780 nm, respectively. Here, the refractive indices of BK7 which is glass to the wavelengths of 400 nm, 650 nm, and 780 nm are 1.530849, 1.514520, and 1.511183, respectively.

Referring to FIG. 5, when a pattern having a step size s1 of 1.5 μm is formed by using BK7 as an optical medium, a phase difference of 0.99λ is generated close to an integral multiple with respect to the wavelength λ of the short wavelength light beam 1a for the HD-DVD, a phase difference of 0.98 λ2 is generated close to an integral multiple with respect to the wavelength λ2 of the second long wavelength light beam 1c for the CD, and a phase difference of 0.20 λ1 is generated with respect to the wavelength λ1 of the first long wavelength light beam 1b for the DVD. Here, the size s1 of the step of the pattern formed in the phase corrector being an integral multiple with respect to the light beam having a predetermined wavelength means that, when the light beam having a predetermined wavelength passes through the phase corrector, a change is not generated in the phase difference according to the shape of the pattern.

Thus, the first phase corrector 20 satisfying the conditions of Equations 5 and 7 can be obtained by forming a pattern having a step size s1 of 1.5 μm by using BK7 as the optical medium.

Also, when a pattern having the stepped structure satisfying the conditions of Equations 6 and 8 is formed in a predetermined optical medium like the first phase corrector 20, the second phase corrector 30 can be obtained which transmits the short wavelength light beam 1a and the first long wavelength light beam 1b nearly unchanged and generates a change in the phase difference only for the second long wavelength light beam 1c. An embodiment of the second phase corrector 30 will be described later in detail.

When a pattern having a step size s1 satisfying Equation 7 is formed in the first phase corrector 20, the short wavelength light beam 1a and the second long wavelength light beam 1c pass through the first phase corrector 20 nearly unchanged, but a change in the phase difference according to the shape of the pattern is generated in the first long wavelength light beam 1b as the first long wavelength light beam 1b passes through the first phase corrector 20. Also, when a pattern having a step size s2 satisfying Equation 8 is formed in the second phase corrector 30, the short wavelength light beam 1a and the first long wavelength light beam 1b pass through the second phase corrector 30 nearly unchanged, but a change in the phase difference according to the shape of the pattern is generated in the second long wavelength light beam 1c as the second long wavelength light beam 1c passes through the second phase corrector 30.

Thus, a compatible optical pickup according to an aspect of the present invention having two kinds of phase correctors, that is, the first and second phase correctors 20 and 30, which are manufactured to have the step of the pattern to be an integral multiple of two wavelengths and generate the change in the phase difference in only one wavelength, can sufficiently reduce generation of aberration when three types of optical discs 50a, 50b, and 50c having different thicknesses are adopted.

Referring back to FIG. 1, the optical pickup according to an aspect of the present invention, may further include a first aperture filter 25 to change the effective NA of the objective lens 40 with respect to the first long wavelength light beam 1b and a second aperture filter 35 to change the effective NA of the objective lens 40 with respect to the second long wavelength light beam 1c.

The first and second aperture filters 25 and 35 may be wavelength selective coating members or holographic diffractive members, which can change the effective NA of the objective lens 40 by selectively preventing proceeding of the light beam incident on outer ring portions 25a and 35a according to the wavelength thereof, while making the light beam incident on a central portion thereof proceed unchanged.

The first and second aperture filters 25 and 35 can be formed such that an inside of the ring portions 25a and 35a are open, as shown in FIG. 1, and may be formed integrally with the first and second phase correctors 20 and 30, respectively.

The ring portion 25a of the first aperture filter 25 blocks only the first long wavelength light beam 1b and transmits the short wavelength light beam 1a and the second long wavelength light beam 1c unchanged. Here, an inner diameter of the ring portion 25a of the first aperture filter 25 may be formed to have a size small enough to obtain an effective NA of the objective lens 40 suitable to record and/or to reproduce the first low density optical disc 50b. For example, when the first low density optical disc 50b is the DVD, the inner diameter of the ring portion 25a of the first aperture filter 25 may be formed to have a size small enough to obtain an effective NA of 0.6 of the objective lens 40.

The ring portion 35a of the second aperture filter 35 blocks only the second long wavelength light beam 1c and transmits the short wavelength light beam 1a and the first long wavelength light beam 1b unchanged. Here, the inner diameter of the ring portion 35a of the second aperture filter 35 may be formed to have a size small enough to obtain an effective NA of the objective lens 40 suitable to record and/or to reproduce the second low density optical disc 50c. For example, when the second low density optical disc 50c is the CD, the inner diameter of the ring portion 35a of the second aperture filter 35 may be formed to have a size small enough to obtain an effective NA of 0.45 of the objective lens 40.

In the meantime, FIG. 6 shows an optical configuration of a compatible optical pickup according to an aspect of the present invention. Referring to FIG. 6, the optical unit 1 includes a first light source 2 to emit the short wavelength light beam 1a having a wavelength λ suitable to record and/or to reproduce the high density optical disc 50a, a first photodetector 13 to receive and detect the light beam reflected by the high density optical disc 50a, first and second optical modules 7 and 8 to emit the first and second long wavelength light beams 1b and 1c having wavelengths λ1 and λ2 suitable to record and/or to reproduce the first and second low density optical discs 50b and 50c, and first through third optical path changers 3, 6, and 4 to change proceeding paths of the short wavelength light beam 1a and the first and second long wavelength light beams 1b and 1c, respectively, emitted from the first light source 2 and first and second optical modules 7 and 8.

When the HD-DVD is adopted in the high density optical disc 50a, a blue-violet semiconductor laser emitting the short wavelength light beam 1a having a wavelength of, for example, 400 nm, can be provided as the first light source 2.

The first optical module 7 has a structure in which the light source to emit the first long wavelength light beam 1b and a photodetector to receive the first long wavelength light beam 1b reflected by the first low density optical disc 50b are incorporated together. Likewise, the second optical module 8 has a structure in which the light source to emit the second long wavelength light beam 1c and a photodetector to receive the second long wavelength light beam 1c reflected by the second low density optical disc 50c are incorporated together. When the first and second low density optical discs 50b and 50c are the DVD and the CD, a red semiconductor laser emitting the first long wavelength light beam 1b having a wavelength of, for example, 650 nm, and the infrared semiconductor laser emitting the second long wavelength light beam 1c having a wavelength of, for example, 780 nm, can be provided as light sources in the first and second optical modules 7 and 8, respectively.

Here, because the structure of the first and second optical modules 7 and 8 are well known in the field relating to the present technology, a detailed description and illustration will be omitted herein.

The compatible optical pickup shown in FIG. 6 has an optical configuration suitable for a case in which a polarizing holographic device is provided as the diffractive device 15. The first light source 2 emits the short wavelength light beam 1a having, for example, a P polarization, and the first and second optical modules 7 and 8 emit the first and second long wavelength light beams 1b and 1c having, for example, an S polarization.

A polarized beam splitter may be provided as the first optical path changer 3 to improve the efficiency of light with respect to the short wavelength light beam 1a. A beam splitter having a transmittance and a reflectance to the S polarization in a ratio of 50:50, for example, to transmit and reflect the first and second long wavelength light beams 1b and 1c emitted from the first and second optical modules 7 and 8 in a similar ratio, can be provided as the second optical path changer 6. A beam splitter having a transmittance of 90% or more to the short wavelength light beam 1a and a reflectance of 90% or more to the S polarization with respect to the first and second long wavelength light beams 1b and 1c, for example, can be provided as the third optical path changer 4.

In the meantime, a collimating lens 5 is provided to focus the short wavelength light beam 1a and the first and second long wavelength light beams 1b and 1c emitted from the first light source 2 and the first and second optical modules 7 and 8, and to approximately convert the short wavelength light beam 1a and the first and second long wavelength light beams 1b and 1c into parallel beams. The collimating lens 5 may be provided on the optical path between the third optical path changer 4 and the objective lens 40.

When a polarizing holographic device is provided as the diffractive device 15, the wave plate 19, as shown in FIG. 6, may be arranged between the diffractive device 15 and the objective lens 40. In an aspect of the present invention, the wave plate 19, as previously described, works as a quarter wave plate with respect to the short wavelength light beam 1a and a half wave plate with respect to the first and second long wavelength light beams 1b and 1c.

Figure 7A:
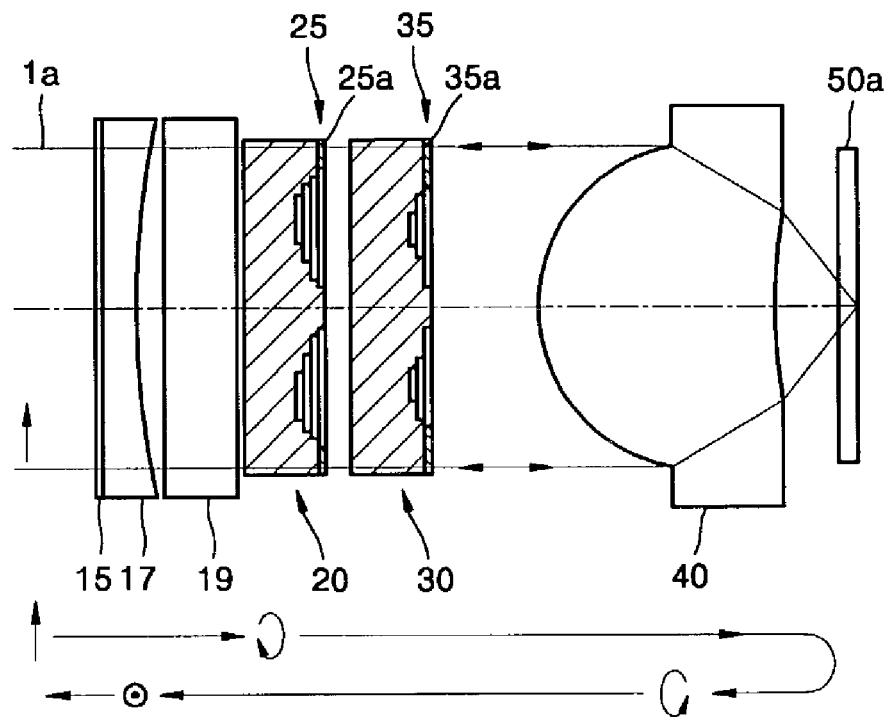
FIG. 7A is a view showing changes in a polarization of the short wavelength light beam having a polarization perpendicular to a polarization of the first and second long wavelength light beams when a polarization type diffractive device is provided in FIG. 1.
Figure 7B:
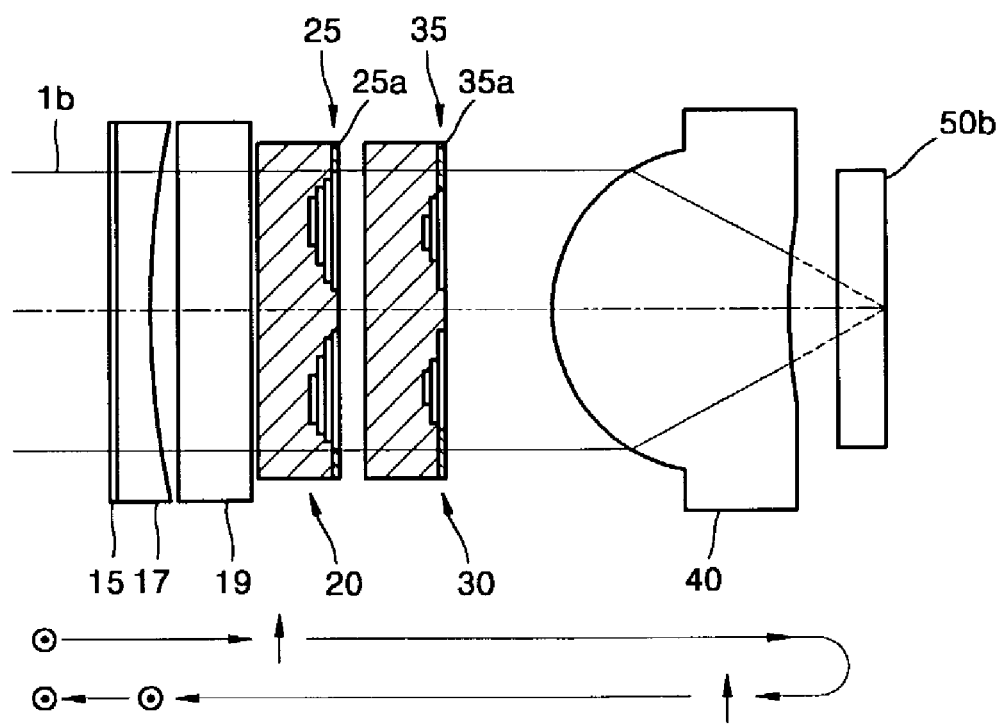
FIG. 7B is a view showing changes in a polarization of the first long wavelength light beam having a polarization perpendicular to a polarization of the short wavelength light beam when a polarization type diffractive device is provided in FIG. 1.
Figure 7C:
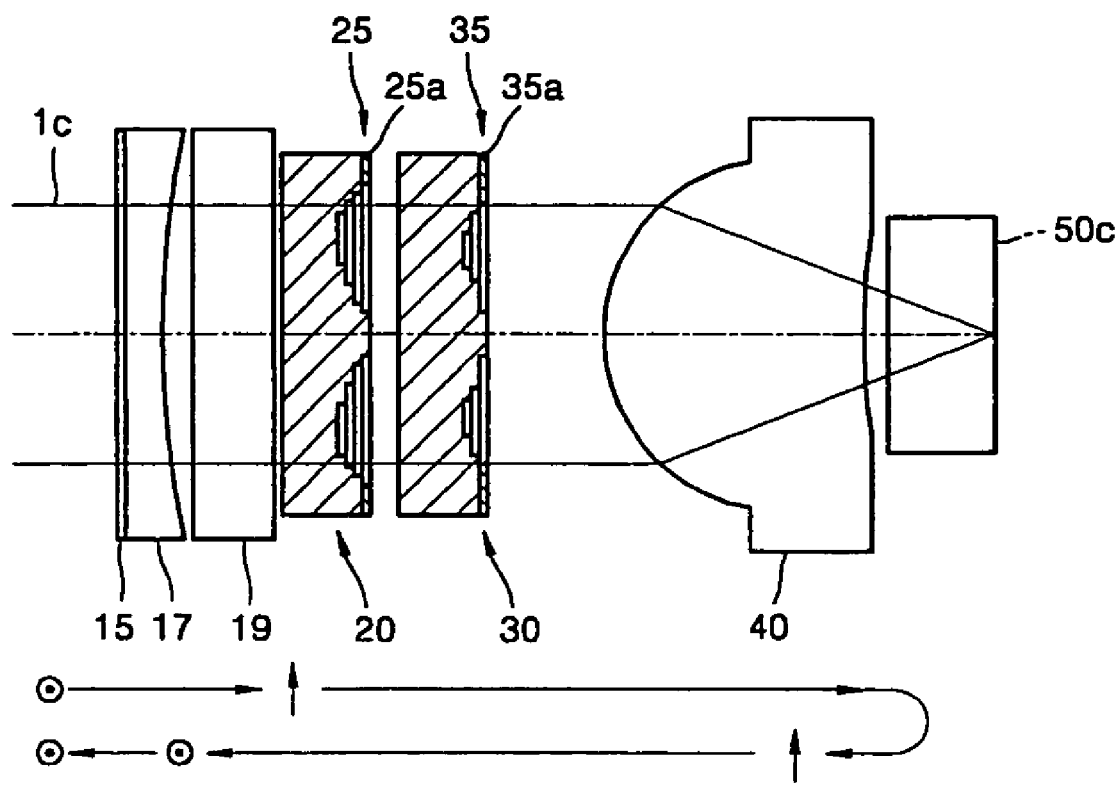
FIG. 7C is a view showing changes in a polarization of the second long wavelength light beam having a polarization perpendicular to a polarization of the short wavelength light beam when a polarization type diffractive device is provided in FIG. 1.

In this case, as shown in FIG. 7A in which a change in polarization of the short wavelength light beam 1a is shown, the short wavelength light beam 1a having the P polarization when the beam 1a comes from the optical unit 1 is diffracted by the polarizing holographic device, whereas, when the short wavelength light beam 1a is input after being reflected by the high density optical disc 50a, the beam 1a has an S polarization and is not diffracted by the polarizing holographic device. Also, as shown in FIGS. 7B and 7C in which changes in polarization of the first and second long wavelength light beams 1b and 1c are shown, because the first and second long wavelength light beams 1b and 1c have the S polarization in both cases in which the beams 1b and 1c come from the optical unit 1 and are input after being reflected by the first and second low density optical discs 50b and 50c, respectively, the first and second long wavelength light beams 1b and 1c are not diffracted by the polarizing holographic device.

In the meantime, as shown in FIG. 6, because the short wavelength light beam 1a reflected by the high density optical disc 50a and passing through the diffractive device 15 is not diffracted by the diffractive device 15, the short wavelength light beam 1a proceeding back toward the collimating lens 5 becomes a divergent beam. The divergent beam is approximately converted to a parallel beam by the collimating lens 5 and proceeds toward the first photodetector 13 via the third and first optical path changers 4 and 3. Here, because the short wavelength light beam 1a proceeding toward the first photodetector 13 is in a form of a nearly parallel beam, a condensing lens 9 to condense the parallel beam is provided between the first optical path changer 3 and the first photodetector 13. Also, a sensing lens 11 may be provided between the condensing lens 9 and the first photodetector 13. The sensing lens 11, as it is well known in the field of the present technology, is adjusted along the optical axis to match a zero position of an S-curve of a focus error signal and a position of an information surface of the high density optical disc 50a.

FIG. 8 shows an optical configuration of a compatible optical pickup according to another aspect of the present invention. Because the same reference numerals as those in FIG. 6 indicate the same elements having the same or similar functions, detailed descriptions thereof will be omitted herein.

Referring to FIG. 8, a compatible optical pickup according to another aspect of the present invention, includes the diffractive device 15 (described with reference to FIGS. 4 and 5) to selectively diffract the light beam having a particular wavelength regardless of polarization. In this case, unlike the case shown in FIG. 6, a wave plate 19 need not be arranged between the diffractive device 15 and the objective lens 40. FIG. 8 shows an example in which a polarized beam splitter is provided as the first optical path changer 3 and a wave plate 69 is provided between the first and third optical path changers 3 and 4, to improve the efficiency of the light with respect to the short wavelength light beam 1a. Here, the wave plate 69 may be a quarter wave plate with respect to the short wavelength light beam 1a.

In the meantime, when the diffractive device 15 is provided to selectively diffract only the light beam having a particular wavelength regardless of the polarization, the short wavelength light beam 1a reflected by the high density optical disc 50a is diffracted as the beam 1a passes through the diffractive device 15. Thus, the short wavelength light beam 1a reflected by the high density optical disc 50a proceeds back along the same optical path as that along which is emitted from the optical unit 1, and proceeds toward the first photodetector 13 in a form of a convergent beam. Thus, unlike the case shown in FIG. 6, the condensing lens 9 does not need to be provided between the first optical path changer 3 and the first photodetector 13.

Because FIGS. 6 and 8 show examples of the optical structure of the compatible optical pickup according to an aspect of the present invention, a variety of optical structures other than the above can be applied to the compatible optical pickup, according to an aspect of the present invention.

Additionally, although FIGS. 6 and 8 show examples in which cubic beam splitter type optical path changers are provided, the present invention is not limited thereto and a variety of modifications to the first through third optical path changers 3, 6, and 4 are available.

A proceeding process of the light beam in the compatible optical pickup, according to an aspect of the present invention, will now be described based on the optical configuration shown in FIG. 6.

First, when the high density optical disc 50a is adopted, the short wavelength light beam 1a of the P polarization emitted from the first light source 2 sequentially passes through the first and third optical path changers 3 and 4 and is converted to the parallel beam by the collimating lens 5 and is output from the optical unit 1. The P polarized short wavelength light beam 1a emitted from the optical unit 1 is diffracted by the diffractive device 15, is converted to a nearly parallel beam by the divergent lens 17, is changed to a circular polarization by the wave plate 19, and proceeds toward the first and second phase correctors 20 and 30. The short wavelength light beam 1a passes through the first and second phase correctors 20 and 30 and the first and second aperture filters 25 and 35, unchanged, and is focused by the objective lens 40. The light beam 1a is formed as the light spot on a recording surface of the high density optical disc 50a. The short wavelength light beam 1a which has another orthogonal circular polarization as being reflected by the high density optical disc 50a sequentially, passes through the objective lens 50a and the first and second phase correctors 20 and 30 and then, the polarization is changed to the S polarization as the light beam 1a passes through the wave plate 19. The S polarized short wavelength light beam 1a is incident on the divergent lens 17 and is changed to a divergent beam, and passes through the diffractive device 15, unchanged, to be incident on the optical unit 1. The short wavelength light beam 1a input to the optical unit 1 is in a form of a nearly parallel beam by the collimating lens 5 and passes through the third optical path changer 4 to be input to the first optical path changer 3. The short wavelength light beam 1a is reflected by the first optical path changer 3 and is incident on the condensing lens 9. Then, the light beam 1a is focused by the condensing lens 9 and the sensing lens 11 to be received by the first photodetector 13.

When the first low density optical disc 50b is adopted, the first long wavelength light beam 1b having the S polarization emitted from the first optical module 7 passes through the second optical path changer 6 and is incident on the third optical path changer 4. The first long wavelength light beam 1b is reflected by the third optical path changer 4 and is incident on the collimating lens 5, and is changed to a nearly parallel beam by the collimating lens 5. The S polarized first long wavelength light beam 1b passes through the diffractive device 15, unchanged, and is changed to a divergent beam by the divergent lens 17. The S polarized first long wavelength light beam 1b passes through the wave plate 19 and is approximately changed to the light beam having the P polarization as the light beam 1b passes through the wave plate 19. The light beam 1b is incident on the first phase corrector 20. A change in a phase difference is generated in the first long wavelength light beam 1b so that the first phase corrector 20 can correct spherical aberration and/or chromatism, and the first long wavelength light beam 1b is incident on the first aperture filter 25. The first long wavelength light beam 1b is partially blocked by the first aperture filter 25 and only a part thereof proceeding toward the inside of the ring portion 25a passes through the first aperture filter 25 to have a size small enough to obtain an effective NA, for example, an effective NA of 0.6, suitable to record and/or reproduce the first low density optical disc 50b. The first long wavelength light beam 1b passes through the second phase corrector 30 and the second aperture filter 35, unchanged, is incident on the objective lens 40, and the objective lens 40 focuses the light beam 1b so that the light spot is formed on the recording surface of the first low density optical disc 50b. The first long wavelength light beam 1b reflected by the first low density optical disc 50b is converted to the S polarization beam while passing through the wave plate 19 and proceeds back to the first optical module 7 along the opposite path.

When the second low density optical disc 50c is adopted, the second long wavelength light beam 1c having the S polarization emitted from the second optical module 8 is sequentially reflected by the second and third optical path changers 6 and 4 and is converted to a nearly parallel beam by the collimating lens 5. The S polarized second long wavelength light beam 1c passes through the diffractive device 15, unchanged, and is changed to the divergent beam by the divergent lens 17. The S polarized second long wavelength light beam 1c is approximately changed to the P polarized light beam as the light beam 1c passes through the wave plate 19 and is incident on the first phase corrector 20. The second long wavelength light beam 1c passes through the first phase corrector 20 and the first aperture filter 25, unchanged, and is incident on the second phase corrector 30. A change in a phase difference is generated in the second long wavelength light beam 1c so that the second phase corrector 30 can correct spherical aberration and/or chromatism. The second long wavelength light beam 1c is partially blocked by the second aperture filter 35 and only a part thereof proceeding toward the inside of the ring portion 35a passes through the second aperture filter 35 to have a size small enough to obtain an effective NA, for example, an effective NA of 0.45, suitable to record and/or to reproduce the second low density optical disc 50c. The second long wavelength light beam 1c is focused by the objective lens 40 so that the light spot is formed on the recording surface of the second low density optical disc 50c. The second long wavelength light beam 1c having the P polarization reflected by the second low density optical disc 50c is changed to have the S polarization as the light beam 1c is passing through the wave plate 19, and proceeds back to the second optical module 8 along the opposite path.

An optical design of a compatible optical pickup according to an aspect of the present invention will now be described.

Figure 9A:
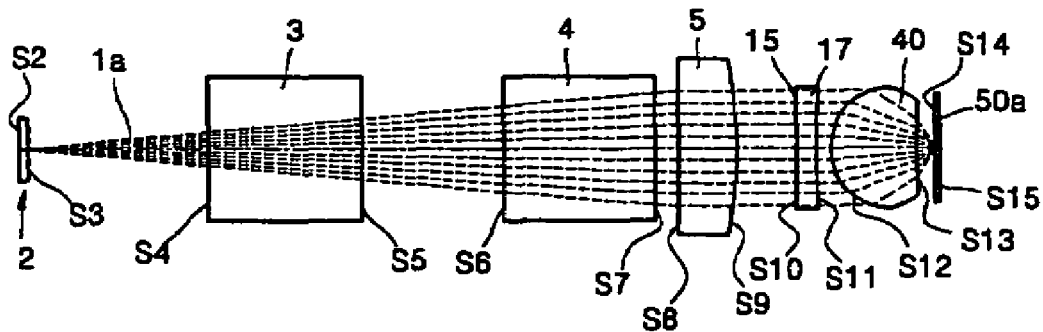
FIG. 9A is a view showing an optical path of the short wavelength light beam when the compatible optical pickups shown in FIGS. 6 and 8 are separated into an optical system contributing to recording and/or reproduction of an HD-DVD.
Figure 9B:
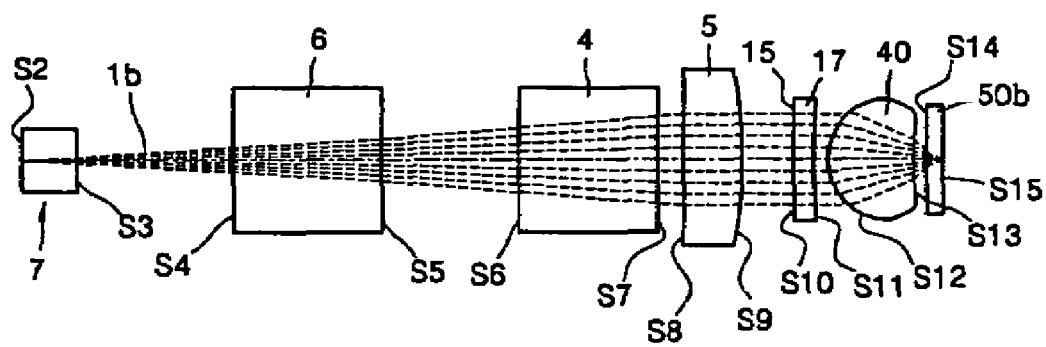
FIG. 9B is a view showing the optical path of the first long wavelength light beam when the compatible optical pickups shown in FIGS. 6 and 8 are separated into an optical system contributing to recording and/or reproduction of a DVD.
Figure 9C:
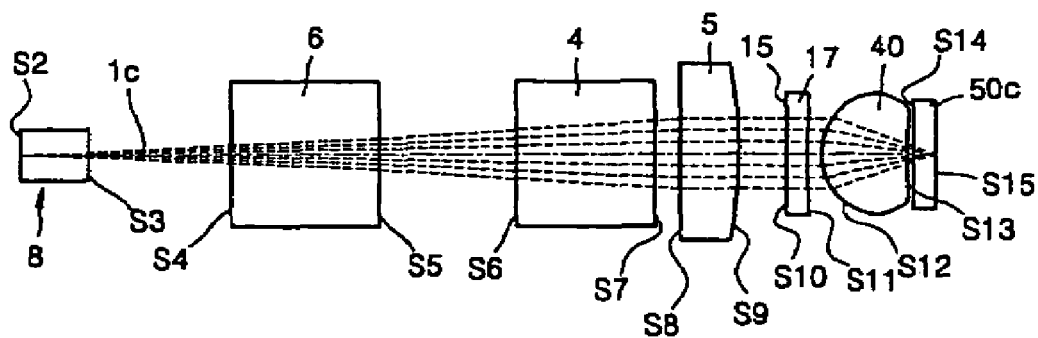
FIG. 9C is a view showing the optical path of the second long wavelength light beam when the compatible optical pickups shown in FIGS. 6 and 8 are separated into an optical system contributing to recording and/or reproduction of a CD.

FIGS. 9A through 9C show the optical paths of the short wavelength light beam 1a and first and second long wavelength light beams 1b and 1c when the compatible optical pickups shown in FIGS. 6 and 8 are separated into an optical system contributing to recording and/or reproduction of the HD-DVD, the DVD, and the CD. Table 2 shows a design example by which the optical paths of FIGS. 9A through 9C can be obtained. In Table 2, the short wavelength light beam 1a and the first and second long wavelength light beams 1b and 1c are 400 nm, 650 nm, and 780 nm, respectively.

TABLE 2

| surface | Radius of Curvature (mm) | Thickness/ Interval (mm) | Material (Glass) |
|---|---|---|---|
| Surface of Object | INFINITY | INFINITY | |
| S1 | INFINITY | 0.000000 | |
| S2 | INFINITY | 0.250000 2.000000 2.500000 | BK7_HOYA |

TABLE 2-continued

| surface | Radius of Curvature (mm) | Thickness/ Interval (mm) | Material (Glass) |
|---|---|---|---|
| S3 | INFINITY | 6.163560 5.56580 5.35287 | |
| S4 | INFINITY | 5.000000 | BK7_HOYA |
| S5 | INFINITY | 5.000000 | |
| S6 | INFINITY | 5.000000 | BK7—HOYA |
| S7 | INFINITY | 1.000000 | |
| S8 | 133.350456 K: −307.351031 | 2.000000 | M-BaCD5N_HOYA |
| S9 | −13.236664 K: −0.453871 | 2.000000 | |
| S10 | INFINITY HOE C1: −1.9676E−02 | 0.700000 | M-BaCD5N_HOYA |
| S11 | 15.073272 | 0.500000 | |
| S12 (STOP) | 1.716498 K: −0.631379 A: 0.599226E−02 B: 0.113447E−02 C: 0.136628E−03 D: 0.320343E−04 E: 0.779174E−05 F: −.316106E−05 G: 0.885052E−07 H: 0.308966E−06 J: −.747648E−07 | 2.850000 | M-LaC130_HOYA |
| S13 | −10.695842 K: −159.109260 A: 0.208702E+00 B: −.240069+00 C: 0.129315E+00 D: −.284858E−01 | 0.641810 0.61492 0.26732 | |
| S14 | INFINITY | 0.100000 0.60000 1.20000 | 'CG' |
| S15 | INFINITY | 0.00000 | |
| Image Surface | INFINITY | 0.00000 | |

In Table 2, a thickness/interval data of the surfaces S2, S3, S13, and S14 correspond to the HD-DVD, the DVD, and the CD, respectively, from the above. The thickness between the surface S2 and the surface S3 is a thickness of a window with respect to the first light source 2 of 400 nm and a thickness of a transparent member with respect to the first and second optical modules 7 and 8 of 650 nm and 780 nm.

In Table 2, K denotes a conic constant of the aspheric surfaces S2 and S3 and A, B, C, D, E, F, G, H, and J denote aspheric coefficients. When a depth from an apex of an aspherical surface is z, an equation of the aspherical surfaces S2 and S3 can be expressed by the following Equation 9:

$$z = \frac{ch^2}{1 + \sqrt{1-(1+K)c^2h^2}} + Ah^4 + Bh^6 + Ch^8 + Dh^{10} + Eh^{12} + Fh^{14} + Gh^{16} + Hh^{18} + Jh^{20}$$

Equation 9

Here, h denotes a height from the optical axis, c denotes a curvature, and A-J denote the aspheric coefficients.

In Table 2, the surface S10 denotes a diffractive surface of the diffractive device (the holographic device) 15 and C1 denotes a coefficient indicating power. A phase difference of the holographic device can be expressed by the following Equation 10 in a form of a rotationally symmetric form:

$$\phi = \frac{2\pi}{\lambda_0} \sum_n C_n r^{2n}$$

Equation 10

Here, $\phi$, $C_n$, and r denote a phase difference, a coefficient, and polar coordinate, respectively.

TABLE 3

| Wavelength | | 400 nm | 650 nm | 780 nm |
|---|---|---|---|---|
| Refractive index | BK7_HOYA | 1.530196 | 1.514520 | 1.511183 |
| | M-BaCD5N_HOYA | 1.605183 | 1.586417 | 1.582468 |
| | M-LaC130_HOYA | 1.715566 | 1.689858 | 1.684657 |
| | 'CG' | 1.621462 | 1.581922 | 1.575091 |
| Diameter of Entrance Pupil | | 3.886 | 2.8 | 2.1 |

Table 3 shows refractive indices of BK7_HOYA, M-BaCD5N_HOYA, and M-LaC130_HOYA, which are glass materials used as the optical media of the various optical elements, and 'CG' which is the optical medium of the optical disc, with respect to wavelengths of 400 nm, 650 nm, and 780 nm, in the design example of Table 2, and a diameter of an entrance pupil of the short wavelength light beam 1a having the wavelength of 400 nm, the first long wavelength light beam 1b having the wavelength of 650 nm, and the second long wavelength light beam 1c having the wavelength of 780 nm, which are incident on the objective lens 40 in FIGS. 9A through 9C.

In the case of the optical data of Table 2 and Table 3, as can be seen from FIG. 9A, a working distance of about 0.6 mm can be obtained with respect to the HD-DVD having a thickness of 0.1 mm. As can be seen from FIG. 9B, a working distance of about 0.57 mm can be obtained with respect to the DVD having a thickness of 0.6 mm. Also, as can be seen from FIG. 9C, a working distance of about 0.23 mm can be obtained with respect to the CD having a thickness of 1.2 mm. Here, in FIGS. 9A through 9C, the working distances of 0.6 mm, 0.57 mm, and 0.23 mm of the objective lens 40 with respect to the HD-DVD, the DVD, and the CD are obtained by subtracting 0.04 mm, due to the shape of the objective lens from the working distances of 0.641810 mm, 0.61492 mm, and 0.26732 mm of the objective lens 40 with respect to the HD-DVD, the DVD, and the CD shown in Table 2.

Thus, as can be seen from the aspects of the present invention shown in Table 2, Table 3, and FIGS. 9A through 9C, because the compatible optical pickup can increase the working distance by the divergent lens 17 with respect to the first and second long wavelength light beams 1b and 1c, even when the objective lens 40 is adopted, which is designed to have a short working distance of not more than 0.7 mm, with respect to the high density optical disc 50a, a working distance sufficient to prevent collision between the objective lens 40 and the second low density optical disc 50c can be secured when the second low density optical disc 50c is adopted having a thickness greater than the high density optical disc 50a.

Figure 10A:
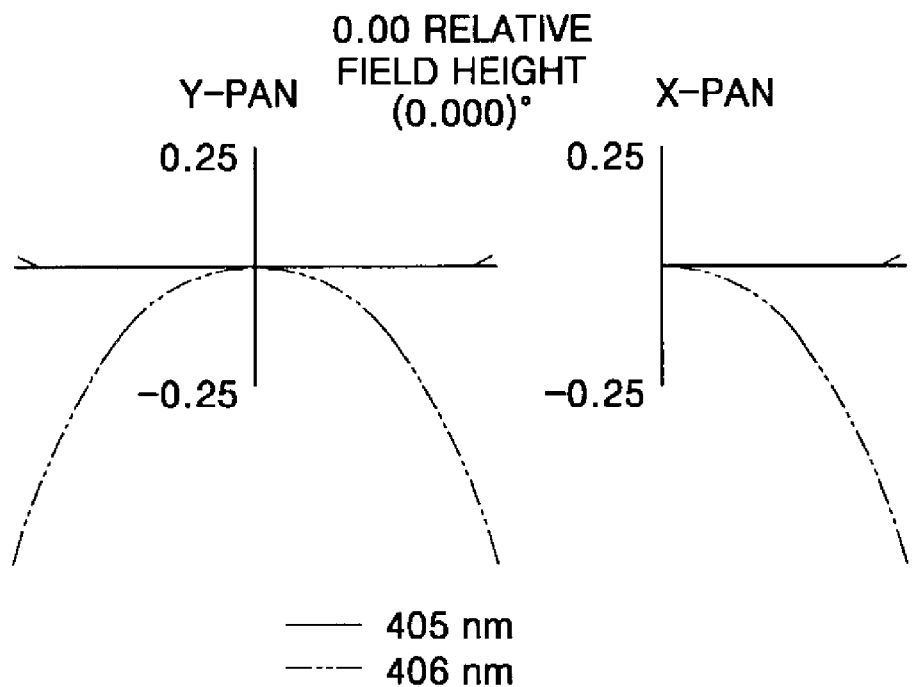
FIG. 10A is two graphs showing chromatism of an objective lens when the wavelength is extended by 1 nm by a mode hopping.
Figure 10B:
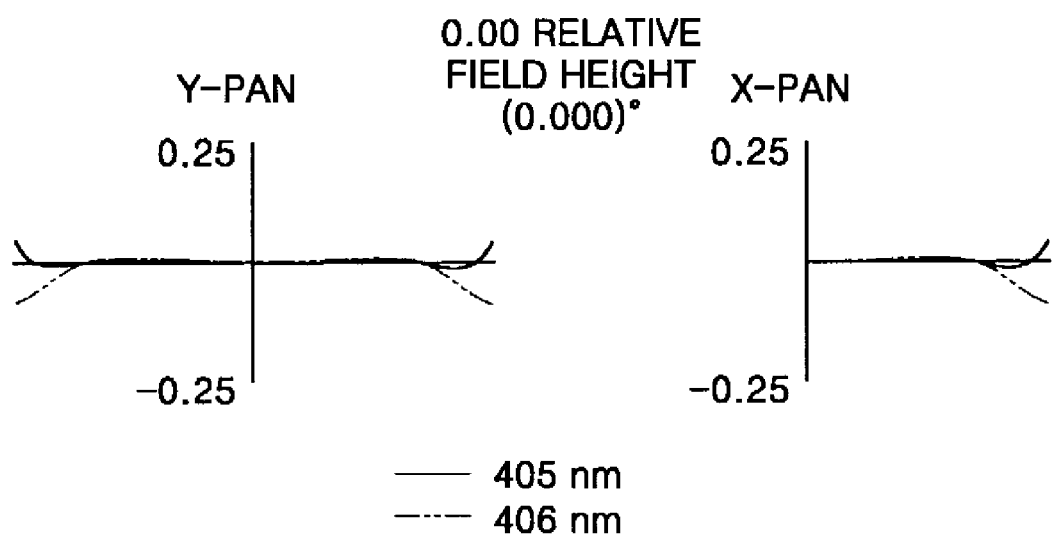
FIG. 10B is two graphs showing chromatism in a case in which a first light source, a collimating lens, a diffractive device, and the objective lens are adopted in the compatible optical pickup according to an aspect of the present invention when the wavelength is extended by 1 nm by the mode hopping.

Also, when the compatible optical pickup, according to an aspect of the present invention, has the optical data such as the data shown in Table 2, Table 3, and FIGS. 9A through 9C, and has the diffractive device 15, aberration due to a change in the wavelength of the short wavelength light beam 1a can be remarkably reduced as can be seen from Table 4 and FIGS. 10A and 10B.

Table 4 shows amounts of aberration and defocus by the objective lens 40 in a normal state in which there is no change in the wavelength, the amounts of aberration and defocus by the objective lens 40 when the wavelength increases by 1 nm by the mode hopping (OL only), and the amounts of aberration and defocus when the first light source (LD: 2), the collimating lens (CL: 5), the diffractive device (diffractive surface: 15), and the objective lens (OL: 40) are all applied as in the compatible optical pickup, according to an aspect of the present invention (LD+CL+diffractive surface+OL). When the wavelength increases by 1 nm by the mode hopping, FIG. 10A shows chromatism of the objective lens 40, FIG. 10B shows chromatism in the case in which the first light source 2, the collimating lens 5, the diffractive device 15, and the objective lens 40 are all applied.

TABLE 4

| Change | OL only | LD + CL + "diffractive surface" + OL |
|---|---|---|
| Chromatism (Normal) | 0.0013 λ | 0.0060 λ |
| Chromatism (Mode Hopping + 1 nm) (Defocus) | 0.1657 λ (510 nm) | 0.0353 λ (103 nm) |

As can be seen from Table 4 and FIGS. 10A and 10B, in the compatible optical pickup according to an aspect of the present invention, when the diffractive device 15 is provided, it can be seen that the amounts of aberration and defocus are remarkably reduced during a change in wavelength according to the mode hopping. In Table 4, the amount of aberration with respect to the "LD+CL+diffractive surface+OL" during the mode hopping is 0.0353λ. Considering a typical aberration allowance is 0.035λ, the amount of aberration of about 0.0353λ is acceptable.

Table 4 indicate the amounts of aberration and defocus for a case in which the first light source (LD: 2), the collimating lens (CL: 5), the diffractive device (diffractive surface: 15), and the objective lens (OL: 40) are applied (LD+CL+diffractive surface+OL), considering actual conditions for use.

Here, the amounts of the aberration and the defocus during coupling of the "diffractive surface+OL" are reviewed below to see a change in the aberration and the defocus when the diffractive device 15 is provided. In the case of the "diffractive surface+OL" aberration in the normal state is 0.00651λ and the amounts of the aberration and the defocus when the wavelength is increased by 1 nm due to the hopping mode are 0.02171λ and 56 nm, respectively.

Referring to Table 5, when the HD-DVD, the DVD, and the CD are adopted, focal lengths of the objective lens having design data of Table 2, with respect to the short wavelength light beam 1a and the first and second long wavelength light beams 1b and 1c are about 2.286 mm, 2.359 mm, and 2.375 mm, respectively, and the effective diameters (NA) of the objective lens 40 with respect to the short wavelength light beam 1a and the first and second long wavelength light beams 1b and 1c are about 3.9 mm (NA=0.85), 2.8 mm (NA=0.60), and 2.1 mm (NA=0.45).

TABLE 5

| | HD-DVD | DVD | CD |
|---|---|---|---|
| Wavelength | 400 nm (λ1) | 650 nm (λ2) | 780 nm (λ3) |
| Thickness of Optical Disc | 0.1 mm | 0.6 mm | 1.2 mm |
| Focal Length of Objective Lens | 2.286 | 2.359 | 2.375 |
| Effective Diameter of Objective Lens (NA) | 3.9 mm (0.85) | 2.8 mm (0.60) | 2.1 mm (0.45) |
| OPDrms | 0.00 λ | 0.30 λ1 | 0.18 λ2 |

With respect to a size of aberration (OPDrms) generated when the objective lens 40 manufactured with the design data of Table 2 is compatibly used for the DVD and the CD, as shown in Table 5, the aberration is hardly generated when the objective lens 40 forms the light spot on the HD-DVD 50a having a thickness of 0.1 mm by focusing the short wavelength light beam 1a having the wavelength of 400 nm. In contrast, when the objective lens 40 forms the light spot on the DVD 50b having a thickness of 0.6 mm by focusing the first long wavelength light beam 1b having a wavelength of 650 nm, aberration of 0.30 λ1 is generated. When the objective lens 40 forms the light spot on the CD 50c having a thickness of 1.2 mm by focusing the second long wavelength light beam 1c having a wavelength of 780 nm, the aberration of 0.18 λ2 is generated. That is, when the objective lens 40 is compatibly used for the DVD and the CD, the spherical aberration is partly corrected by a divergent beam due to the operation of the divergent lens 17, however, an aberration far exceeding a value of 0.0351λ that is typically admitted as an allowable aberration value, is still generated in the optical pickup.

However, when the first and second phase correctors 20 and 30 are arranged at a side of an entrance pupil of the objective lens 40, aberration generated during the compatible use of the DVD and the CD can be remarkably reduced as described later.

Detailed exemplary embodiments of the first and second phase correctors 20 and 30 that are capable of being applied to the compatible optical pickup according to the present invention, and an effect of remarkably reducing aberration generated during compatible use of the DVD and the CD by using the first and second phase correctors 20 and 30, will now be described below. The detailed aspects of the first and second phase correctors 20 and 30 are described for the case in which the wavelengths λ, λ1, and λ2 of the short wavelength light beam 1a and the first and second long wavelength light beams 1b and 1c are 400 nm, 650 nm, and 780 nm, respectively.

Figure 11:
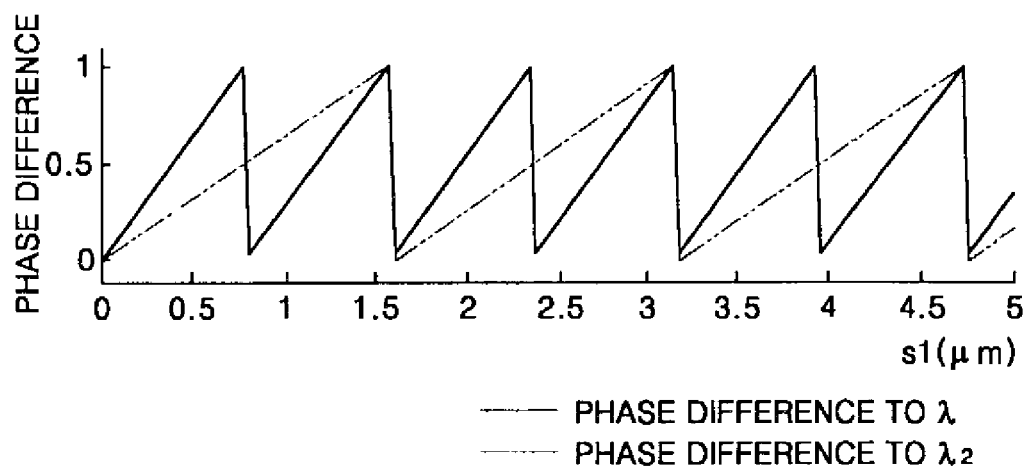
FIG. 11 is a graph showing a phase difference between the wavelength λ of the short wavelength light beam for the HD-DVD and the wavelength λ2 of the second long wavelength light beam for the CD according to a size s1 of a pattern step when FCD1 is used as the optical medium of the first phase corrector.
Figure 12:
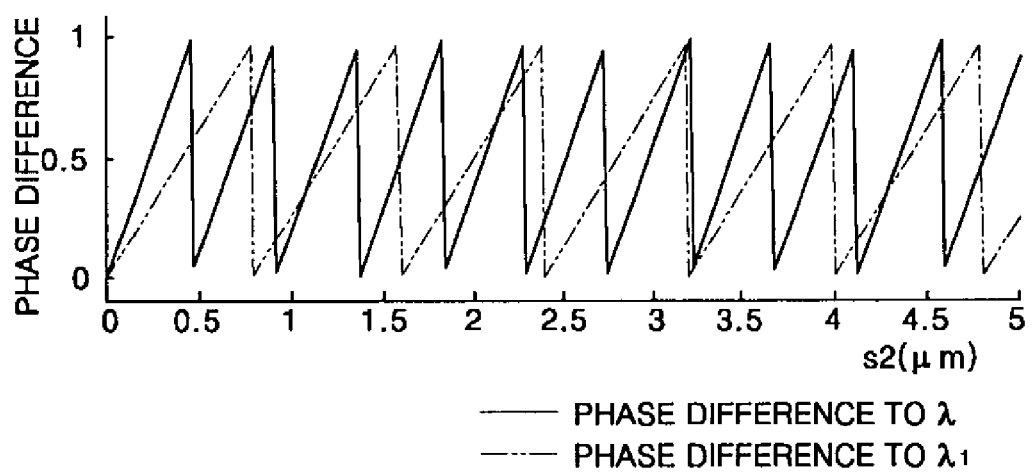
FIG. 12 is a graph showing a phase difference between the wavelength λ of the short wavelength light beam for the HD-DVD and the wavelength λ1 of the first long wavelength light beam for the DVD according to a size s2 of a pattern step when M-NbFD83 is used as the optical medium of the second phase corrector.

Table 6 shows detailed exemplary embodiments of the first and second phase correctors 20 and 30 and remaining aberration when the first and second phase correctors 20 and 30 are used. FIG. 11 is a graph showing the phase difference with respect to the wavelength λ of the short wavelength light beam 1a for the HD-DVD and the wavelength λ2 of the second long wavelength light beam 1c for the CD according to a size s1 of a pattern step when FCD1 is used as an optical medium of the first phase corrector 20. FIG. 12 is a graph showing the phase difference with reference to the wavelength λ of the short wavelength light beam 1a for the HD-DVD and the wavelength λ1 of the first long wavelength light beam 1b for the DVD according to a size s2 of a pattern step when M-NbFD83 is used as the optical medium of the second phase corrector 30. Table 6 and the graphs of FIGS. 11 and 12 are obtained when the wavelength λ of the short wavelength light beam 1a for the HD-DVD is 400 nm, the wavelength λ2 of the second long wavelength light beam 1c for the CD is 780 nm, and the wavelength λ1 of the first long wavelength light beam 1b for the DVD is 650 nm.

TABLE 6

|  |  | HD-DVD | DVD | CD |
|---|---|---|---|---|
| First Phase Corrector for DVD | Glass Material |  | FCD1 |  |
|  | Step depth |  | 1.57 μm |  |
|  | Step Number |  | 5 steps |  |
|  | Phase Difference/Step | 0.99 λ | 0.20 λ1 | 0.99 λ2 |

TABLE 6-continued

|  |  | HD-DVD | DVD | CD |
|---|---|---|---|---|
|  | Refractive index | 1.507672 | 1.495285 | 1.492821 |
|  | Remaining Aberration after Correction (OPDrms) | 0.0112 λ | 0.0045 λ1 | 0.0125 λ2 |
| Second Phase Corrector for CD | Glass Material |  | M-NbFD83 |  |
|  | Step depth |  | 3.2 μm |  |
|  | Step Number |  | 2 steps |  |
|  | Phase Difference/Step | 0.99 λ | 0.00 λ1 | 0.29 λ2 |
|  | Refractive index | 1.873786 | 1.812876 | 1.802912 |
|  | Remaining Aberration after Correction (OPDrms) | 0.0013 λ | 0.0041 λ1 | 0.030 λ2 |

Referring to Table 6 and FIG. 11, when FCD1 is used as an optical medium of the first phase corrector 20 and the size s1 of the step is 1.57 μm, a phase difference of 0.99λ close to an integral multiple with respect to the wavelength λ of the short wavelength light beam 1a for the HD-DVD is generated, a phase difference of 0.99 λ2 close to an integral multiple with respect to the wavelength λ2 of the second long wavelength light beam 1c for the CD is generated, and a phase difference of 0.20 λ1 with respect to the wavelength λ1 of the first long wavelength light beam 1b for the DVD is generated.

When FCD1 is used as the optical medium of the first phase corrector 20, the size s1 of the step is 1.57 μm, and a pattern has a 5-step structure, a change in phase difference is hardly generated as the short wavelength light beam 1a for the HD-DVD and the second long wavelength light beam 1c for the CD pass through the first phase corrector 20. However, a change in phase difference is generated as the first long wavelength light beam 1b for the DVD passes through the first phase corrector 20. Thus, by forming a pattern in the first phase corrector 20 to generate a change in the phase difference which can offset the aberration to the first long wavelength light beam 1b for the DVD, the aberration to the first long wavelength light beam 1b for the DVD can be corrected.

Referring to Table 6 and FIG. 12, when M-NbFD83 is used as the optical medium of the second phase corrector 30 and the size s2 of the step is 3.2 μm, the phase difference of 0.99λ close to an integral multiple with respect to the wavelength λ of the short wavelength light beam 1a for the HD-DVD is generated, a phase difference of 0.00 λ1 close to an integral multiple with respect to the wavelength λ1 of the first long wavelength light beam 1b for the DVD is generated, and a phase difference of 0.29 λ2 with respect to the wavelength λ2 of the second long wavelength light beam 1c for the CD is generated.

When M-NbFD83 is used as the optical medium of the second phase corrector 30, the size s2 of the step is 3.2 μm, and the pattern has a 2-step structure, a change in the phase difference is hardly generated as the short wavelength light beam 1a for the HD-DVD and the first long wavelength light beam 1b for the DVD pass through the second phase corrector 30. However, a change in the phase difference is generated as the second long wavelength light beam 1c for the CD passes through the second phase corrector 30. Thus, by forming a pattern in the second phase corrector 30 to generate the change in the phase difference which can offset the aberration to the second long wavelength light beam 1c for the CD, the aberration of the second long wavelength light beam 1c for the CD can be corrected.

Figure 13:
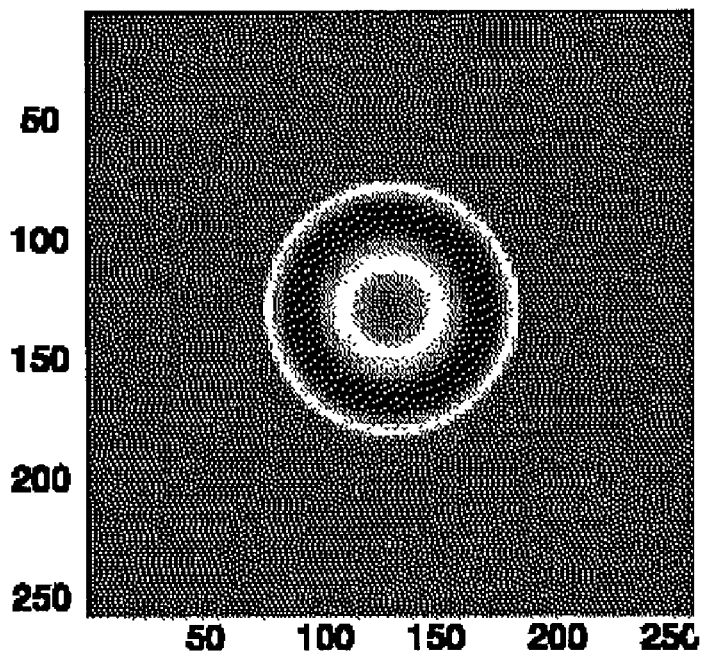
FIG. 13 is a view showing a phase difference, in two dimensions, corresponding to a spherical aberration to be corrected when the DVD is adopted.
Figure 14:
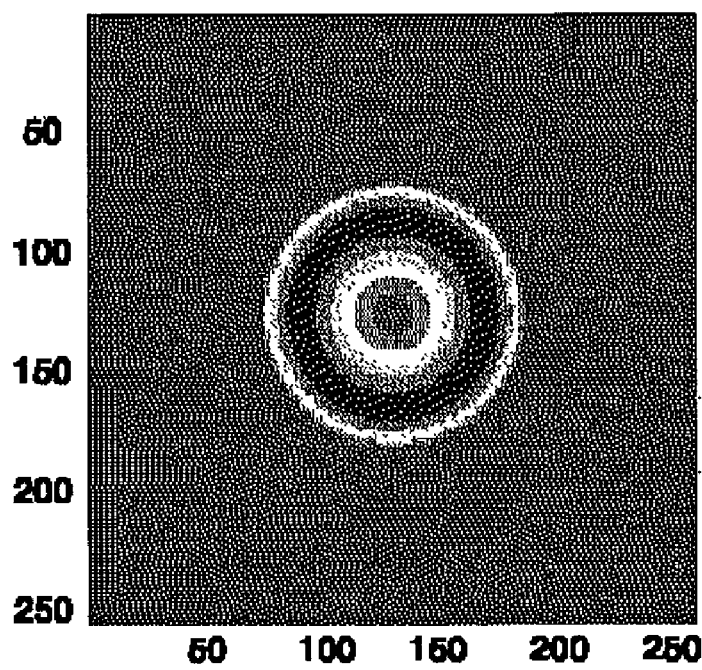
FIG. 14 is a view showing a change in a phase difference, in two dimensions, generated in the first phase corrector in which a pattern having a 5-step structure is formed to correct the phase difference (aberration) shown in FIG. 13.
Figure 15:
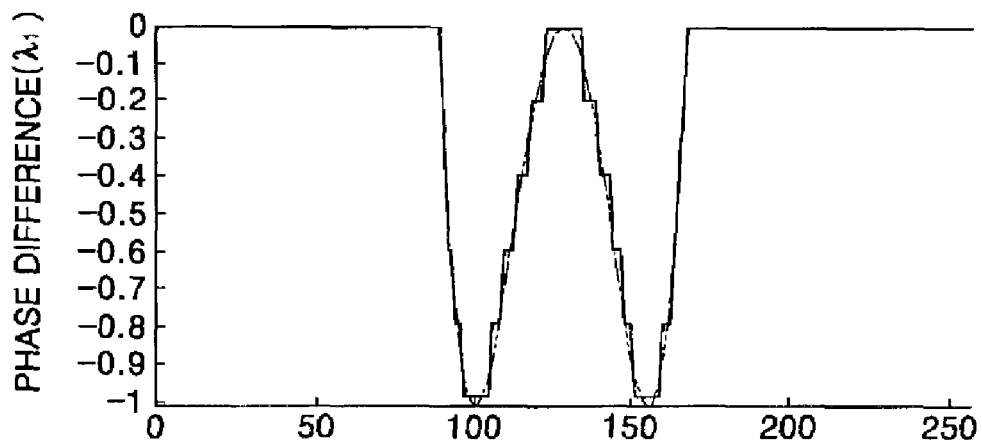
FIG. 15 is a graph showing a one-dimensional section of the phase difference obtained by overlapping FIG. 13 and FIG. 14.

FIG. 13 shows, in two dimensions, a phase difference corresponding to the spherical aberration to be corrected when the DVD is adopted. FIG. 14 shows, in two dimensions, a change in the phase difference generated in the first phase corrector 20 where a pattern having a 5-step structure is formed to correct the phase difference (aberration) shown in FIG. 13. FIG. 15 shows a one-dimensional section obtained by overlapping FIGS. 13 and 14. The phase differences being corrected, shown in FIGS. 13 and 15, are reverse to the phase difference with respect to the aberration generated when the DVD is adopted. A horizontal axis in FIG. 15 has the same scale as that of the horizontal axes of FIGS. 13 and 14, while a vertical axis presents the phase difference in a unit of wavelength.

As can be seen from FIG. 15, according to the first phase corrector 20 according to an aspect of the present invention, the aberration generated when the DVD is adopted can be sufficiently corrected.

Figure 16A:
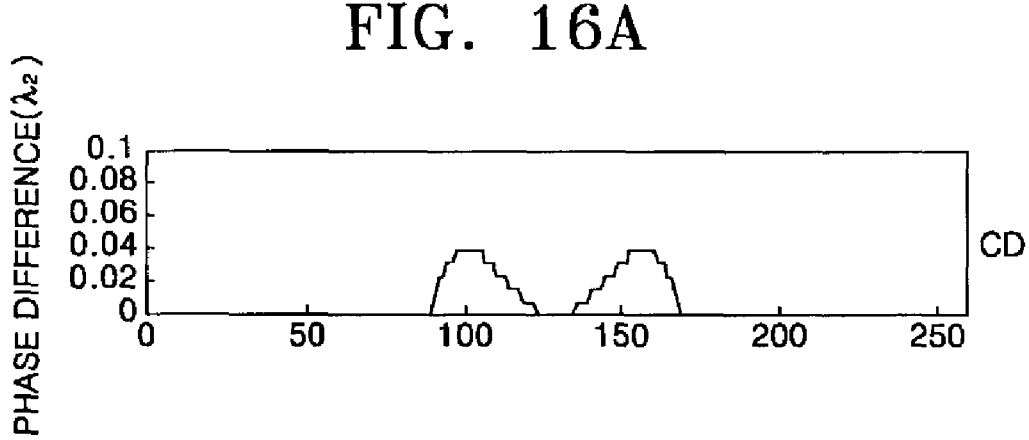
FIG. 16A is a graph showing a phase difference due to the first phase corrector remaining with respect to the second long wavelength light beam during the recording and/or reproduction of the CD.
Figure 16B:
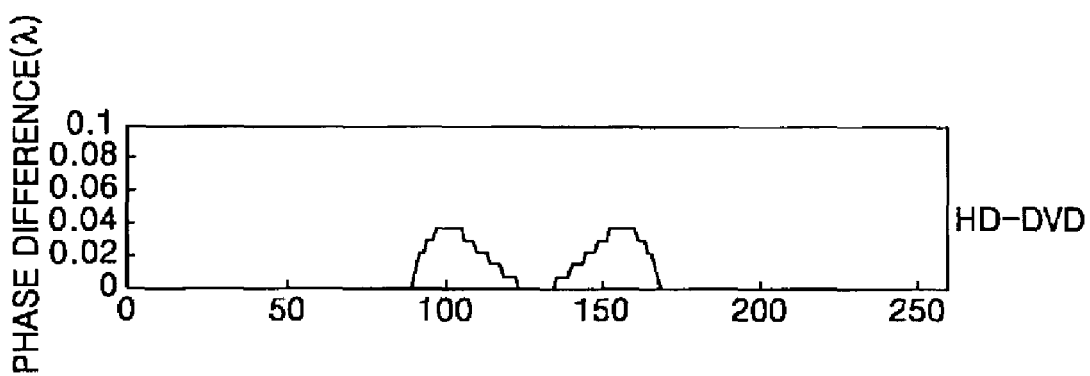
FIG. 16B is a graph showing a phase difference due to the first phase corrector remaining with respect to the short wavelength light beam during the recording and/or reproduction of the HD-DVD.

Here, the size s1 of the step of the pattern formed in the first phase corrector 20 is slightly different from an integral multiple of the wavelength $\lambda$ of the short wavelength light beam 1a for the HD-DVD and an integral multiple of the wavelength $\lambda 2$ of the second long wavelength light beam 1c for the CD, within the above-described range of error. Thus, a phase difference due to the first phase corrector 20 may remain during the recording and/or reproduction of the CD, as shown in FIG. 16A. Also, during the recording and/or reproduction of the HD-DVD, a phase difference due to the first phase corrector 20 may remain as shown in FIG. 16B. Although the phase difference of the first phase corrector 20 remains with respect to the short wavelength light beam 1a and the second long wavelength light beam 1c, as shown in FIGS. 16A and 16B, the amount of aberration due to the remaining phase difference is far less than $0.035\lambda$, as can be seen from Table 6, which is sufficiently allowable. Here, the horizontal axes of FIGS. 16A and 16B indicate the same scale of the horizontal axis of FIG. 15, while the vertical axes present the phase difference in a unit of wavelength.

Figure 17:
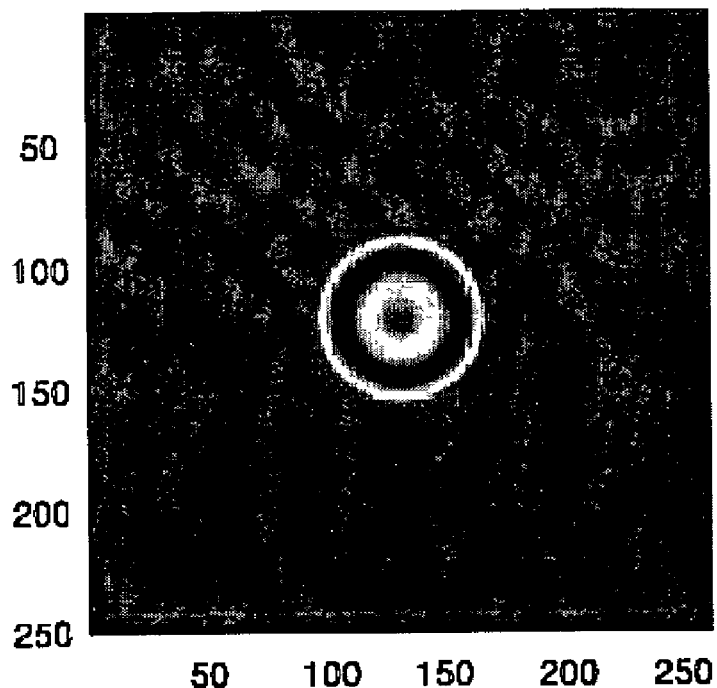
FIG. 17 is a view showing a phase difference, in two dimensions, corresponding to the spherical aberration to be corrected when the CD is adopted.
Figure 18:
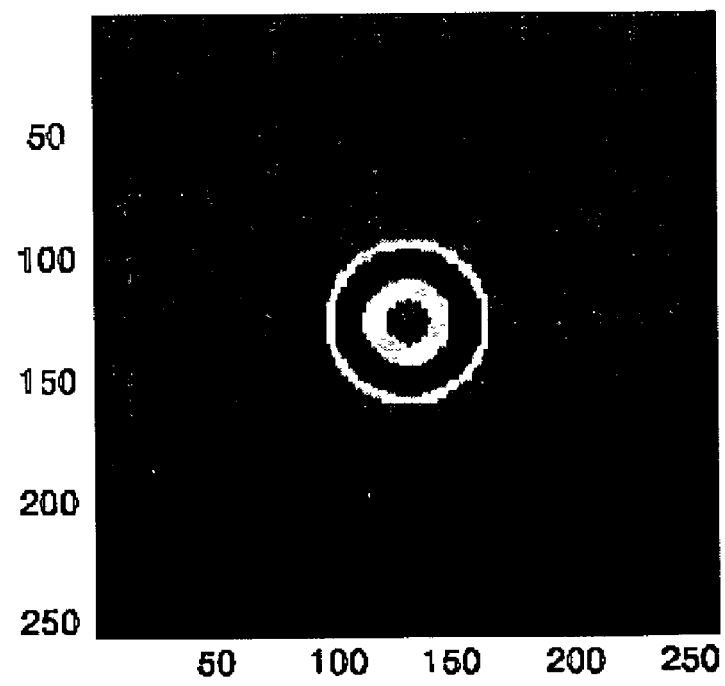
FIG. 18 is a view showing a change in a phase difference, in two dimensions, generated in the second phase corrector in which a pattern having a 2-step structure to correct the phase difference (aberration) shown in FIG. 17 is formed.
Figure 19:
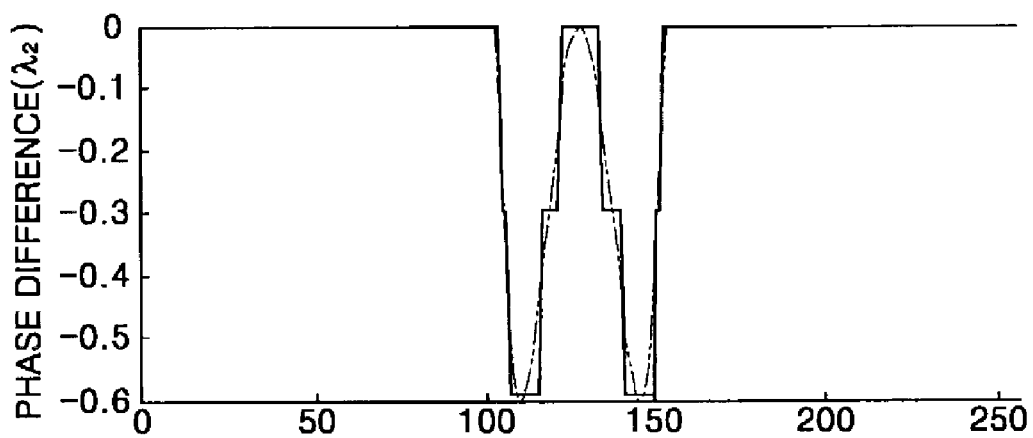
FIG. 19 is a graph showing a one-dimensional section of a phase difference obtained by overlapping FIG. 17 and FIG. 18.

FIG. 17 shows the phase difference, in two dimensions, corresponding to the spherical aberration to be corrected when the CD is adopted, FIG. 18 shows the change in the phase difference, in two dimensions, generated in the second phase corrector 30 in which a pattern is formed having a 2-step structure to correct the phase difference (aberration) shown in FIG. 17. FIG. 19 shows a one-dimensional section of the phase difference obtained by overlapping FIG. 17 and FIG. 18. The horizontal axis in FIG. 19 has the same scale as that of the horizontal axes of FIGS. 17 and 18, while the vertical axis present the phase difference in a unit of wavelength.

As can be seen from FIG. 19, according to the second phase corrector 30 according to an aspect of the present invention, the aberration generated when the CD is adopted can be sufficiently corrected.

Figure 20A:
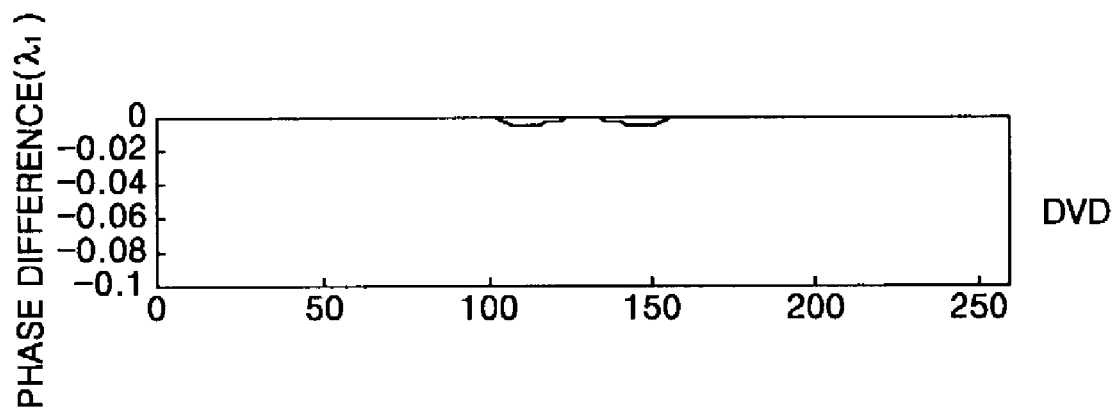
FIG. 20A is a graph showing a phase difference due to the second phase corrector remaining with respect to the first long wavelength light beam during the recording and/or reproduction of the DVD.
Figure 20B:
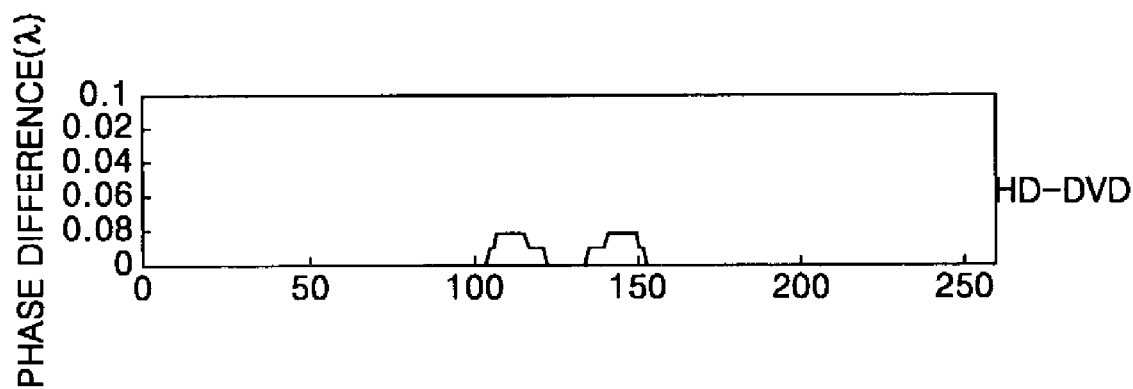
FIG. 20B is a graph showing a phase difference due to the second phase corrector remaining with respect to the short wavelength light beam during the recording and/or reproduction of the HD-DVD.

Here, similar to the case of the first phase corrector 20, the size s2 of the step of the pattern formed in the second phase corrector 30 is slightly different from an integral multiple of the wavelength $\lambda$ of the short wavelength light beam 1a for the HD-DVD, and from an integral multiple of the wavelength $\lambda 1$ of the first long wavelength light beam 1b for the DVD, within the above-described range of error. Thus, a phase difference due to the second phase corrector 30 may remain during the recording and/or reproduction of the DVD, as shown in FIG. 20A. Also, a phase difference due to the second phase corrector 30 may remain during the recording and/or reproduction of information to/from the HD-DVD, as shown in FIG. 20B. Although the phase difference of the second phase corrector 30 remains with respect to the short wavelength light beam 1a and the first long wavelength light beam 1b, as shown in FIGS. 20A and 20B, the amount of aberration due to the remaining phase difference is within a range of allowance as can be seen from Table 6. Here, the horizontal axes of FIGS. 20A and 20B indicate the same scale of the horizontal axis of FIG. 19, while the vertical axes present the phase difference in a unit of wavelength.

Although the stepped pattern of the diffractive device 15 and the first and second phase correctors 20 and 30 are described and illustrated to have physical step structures with reference to FIGS. 2 and 4, the diffractive device 15 and the first and second phase correctors 20 and 30, according to an aspect of the present invention, can be formed to have a refractive index change structure so that a change in the phase difference is generated corresponding to the physical step structure.

For example, an LCD panel manufactured and driven to satisfy the conditions of Equations 5 and 6 and formed to perform the phase correction function in the light beam having a particular wavelength and to transmit the light beams having the other two wavelengths, nearly unchanged, can be provided as the first and second phase correctors 20 and 30.

In the above, a case in which the compatible optical pickup, according to an aspect of the present invention, compatibly adopts the high density optical disc 50a and the first and second low density optical discs 50b and 50c, is described and illustrated. However, the present invention is not limited thereto. For example, the compatible optical pickup, according to an aspect of the present invention, can be provided to compatibly adopt the high density optical disc 50a and the first low density optical disc 50b. In this case, the step size d of the pattern of a non-polarization diffractive device may be formed to satisfy $(n11-n0')d=g\lambda 1$ with respect to the wavelength $\lambda 1$ of the first long wavelength light beam when the refractive index of an optical medium forming the diffractive device is n11 with respect to the wavelength $\lambda 1$ of the first long wavelength light beam. Here, g is a number within a range of an integer ±0.07 and n0' is a refractive index of the air portion with respect to the wavelength $\lambda 1$.

Because the optical configuration of the compatible optical pickup, according to an aspect of the present invention, for the compatible use of the optical discs in two different formats can be obtained by appropriately changing the optical configuration, a detailed description thereof will be omitted herein.

Properties of the optical materials (optical media) used above are copied, as they are, from a catalog printed by HOYA.

As described above, in a compatible optical pickup, according to an aspect of the present invention, because the diffractive device is provided, defocus of a short wavelength light source due to mode hopping can be reduced. Because a divergent lens is provided in the above compatible optical pickup, a sufficient working distance can be secured so that an objective lens does not collide with a low density optical disc with respect to a light beam emitted from the long wavelength light source.

Also, when a high density optical disc and first and second low density optical discs, such as an HD-DVD, a DVD, and a CD, are compatibly recorded and/or reproduced by using three light beams having different wavelengths, because the compatible optical pickup, according to an aspect of the present invention, includes a pair of phase correctors to generate a change in a phase difference with respect to the light beam having a particular wavelength and transmitting light beams having other two wavelengths, nearly unchanged, an aberration generated during recording and/or reproduction of the first and second low density optical discs can be sufficiently corrected.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A compatible optical pickup, comprising:
   an optical unit to emit a short wavelength light beam for a high density optical disc, a first long wavelength light beam for a first low density optical disc, and a second long wavelength light beam for a second low density optical disc, and to receive and detect light beams reflected by the high density optical disc and the low density optical disc;
   an objective lens to form a light spot on the high density optical disc and the first and second low density optical disc by focusing incident short wavelength light beam and the first and second long wavelength light beams;
   a diffractive device to correct chromatism according to a change in a wavelength of the short wavelength light beam by diffracting the short wavelength light beam from the optical unit; and
   a divergent lens to increase a working distance with respect to the first low density optical disc by refracting the first long wavelength light beam from the optical unit toward the objective lens;
   wherein the optical unit is an optical unit to emit the short wavelength light beam for the high density optical disc, the first long wavelength light beam having a wavelength of $\lambda 1$ for the first low density optical disc, and the second long wavelength light beam having a wavelength of $\lambda 2$ for the second low density optical disc, the second low density optical disc having a recording density and a thickness that are different from a recording density and a thickness of the first low density optical disc, and to receive and detect light beams reflected by the high density optical disc, the first low density optical disc, and the second low density optical disc.

2. The compatible optical pickup as claimed in claim 1, wherein the short wavelength light beam and the first long wavelength light beam are polarized orthogonally to each other, the short wavelength light beam and the second long wavelength light beam are polarized orthogonally to each other, and the diffractive device is a polarizing holographic device which diffracts the short wavelength light beam having one polarization and transmits unchanged the first long wavelength light beam and the second long wavelength light beam both having a different polarization orthogonal to the polarization of the short wavelength light beam.

3. The compatible optical pickup as claimed in claim 2, wherein the polarizing holographic device is of a blazed type to improve an efficiency of a first diffraction with respect to the short wavelength light beam.

4. The compatible optical pickup as claimed in claim 1, further comprising:
   an aperture filter to change an effective NA of the objective lens with respect to one of the first and second long wavelength light beams to record and/or reproduce information to/from one of the first and second low density optical discs.

5. The compatible optical pickup as claimed in claim 4, wherein the aperture filter is one of a wavelength selective coating member and a holographic diffractive member which is formed to allow a light beam incident at a central portion of the aperture filter to proceed, unchanged, and to selectively block a light beam incident outside the central portion according to a wavelength of the incident light beam.

6. The compatible optical pickup as claimed in claim 1, wherein the short wavelength light beam is in a blue-violet wavelength area, the first long wavelength light beam is in a red wavelength area, and the second long wavelength light beam is in an infrared wavelength area.

7. The compatible optical pickup as claimed in claim 6, wherein a wavelength $\lambda$ of the short wavelength light beam is in a range of 400-410 nm, the wavelength $\lambda 1$ is one of 635 nm and 650 nm, and the wavelength $\lambda 2$ is 780 nm.

8. The compatible optical pickup as claimed in claim 1, further comprising:
   a wave plate to improve an efficiency of light with respect to the short wavelength light beam.

9. The compatible optical pickup as claimed in claim 8, wherein the wave plate performs a function of a quarter wave plate with respect to the short wavelength light beam.

10. The compatible optical pickup as claimed in claim 1, wherein the diffractive device is a holographic device where a pattern having a stepped structure is formed, and when refractive indices of an optical medium forming the holographic device are n11 and n22 with respect to the wavelengths $\lambda 1$ and $\lambda 2$ of the first and second long wavelength light beams, respectively, a size d of a step of the pattern satisfies the following equations:

$$(n11-n0')d = g\lambda 1, \text{ and}$$

$$(n22-n0'')d = h\lambda 2,$$

where g and h are numbers within a range of an integer ±0.07, and n0' and n0'' are refractive indices of an air portion with respect to the wavelengths of $\lambda 1$ and $\lambda 2$, respectively.

11. The compatible optical pickup as claimed in claim 1, wherein the first and second low density optical discs are in a DVD family and a CD family, respectively.

12. The compatible optical pickup as claimed in claim 11, wherein the high density optical disc has a thickness thinner than a thickness of the first low density optical disc.

13. The compatible optical pickup as claimed in claim 12, wherein the high density optical disc has a thickness of about 0.1 mm.

14. The compatible optical pickup as claimed in claim 12, wherein the objective lens has an NA of at least 0.7.

15. The compatible optical pickup as claimed in claim 14, wherein a working distance of the objective lens is not more than 0.7 mm.

16. The compatible optical pickup as claimed in claim 14, wherein the objective lens has an NA of 0.85.

17. The compatible optical pickup as claimed in claim 1, further comprising:
   first and second phase correctors to correct an aberration generated during use of the first and second low density optical discs by generating a change in a phase difference with respect to the first and second long wavelength light beams.

18. The compatible optical pickup as claimed in claim 17, wherein each of the first and second phase correctors has phase delay areas, when phase delays of the short wavelength light beam having a wavelength of $\lambda$ and the second long wavelength light beam having the wavelength of $\lambda 2$ passing through one of the phase delay areas of the first phase corrector are a and a' respectively, and phase delays of the short wavelength light beam and the second long wavelength light beam passing through another one of the phase delay areas of the first phase corrector adjacent to the one of the phase delay areas of the first phase corrector are b and b', respectively, the first phase corrector satisfies the following equations:

$(a-b)=l\lambda$, and $(a'-b')=m\lambda 2$, where l and m are numbers within a range of an integer $\pm 0.07$, and when phase delays of the short wavelength light beam having the wavelength of $\lambda$ and the first long wavelength light beam having the wavelength of $\lambda 1$ passing through one of the phase delay areas of the second phase corrector are c and c', respectively, and phase delays of the short wavelength light beam and the first long wavelength light beam passing through another one of the phase delay areas of the second phase corrector adjacent to the one of the phase delay areas of the second phase corrector are d and d', respectively, the second phase corrector satisfies the following equations:

$(c-d)=p\lambda$, and $(c'-d')=q\lambda 1$, where p and q are numbers within a range of an integer $\pm 0.07$.

19. The compatible optical pickup as claimed in claim 18, wherein a pattern having a stepped structure is formed in the first phase corrector, a step of the pattern corresponds to the phase delay areas associated with the first phase corrector, and when refractive indices of an optical medium forming the first phase corrector with respect to the wavelengths of $\lambda$ and $\lambda 2$ are n and n2, respectively, a size s1 of the step of the pattern satisfies the following equations:

$(n-n0)s1=l\lambda$, and $(n2-n0'')s1=m\lambda 2$, where n0' and n0'' are refractive indices of an air portion with respect to the wavelengths of $\lambda$ and $\lambda 2$, respectively.

20. The compatible optical pickup as claimed in claim 18, wherein a pattern having a stepped structure is formed in the second phase corrector, a step of the pattern corresponds to the phase delay areas associated with the second phase corrector, and when refractive indices of an optical medium forming the second phase corrector with respect to the wavelengths of $\lambda$ and $\lambda 1$ are n' and n1', respectively, a size s2 of the step of the pattern satisfies the following equations:

$(n'-n0)s2=p\lambda$, and $(n1'-n0')s2=q\lambda 1$, where n0 and n0' are refractive indices of an air portion with respect to the wavelengths of $\lambda$ and $\lambda 1$, respectively.

21. The compatible optical pickup as claimed in claim 17, further comprising:

an aperture filter to change an effective NA of the objective lens with respect to one of the first and second long wavelength light beams to record and/or reproduce information to/from one of the first and second low density optical discs.

22. The compatible optical pickup as claimed in claim 21, wherein the aperture filter is one of a wavelength selective coating member and a holographic diffractive member which is formed to allow a light beam incident at a central portion of the aperture filter to proceed, unchanged, and to selectively block a light beam incident outside the central portion according to a wavelength of the incident light beam.

23. The compatible optical pickup as claimed in claim 21, wherein the aperture filter is integrally formed with one of the first and second phase correctors.

24. The compatible optical pickup as claimed in claim 10, wherein a blazed type pattern is formed in the holographic device.

25. The compatible optical pickup as claimed in claim 1, wherein when the short wavelength light beam output from the optical unit and incident on the diffractive device is a parallel beam, the divergent lens offsets an optical power applied by the diffractive device to the short wavelength light beam and makes the short wavelength light beam be incident on the objective lens as a parallel beam.

26. The compatible optical pickup as claimed in claim 25, wherein the diffractive device and the divergent lens are integrally driven with the objective lens.

27. The compatible optical pickup as claimed in claim 1, further comprising:

a wave plate between the diffractive device and the objective lens to improve an efficiency of light with respect to the short wavelength light beam.

28. The compatible optical pickup as claimed in claim 27, wherein the wave plate performs functions of a quarter wave plate with respect to the short wavelength light beam and a half wave plate with respect to the first long wavelength light beam and the second long wavelength light beam.

29. The compatible optical pickup as claimed in claim 1, further comprising:

a wave plate to improve an efficiency of light with respect to the short wavelength light beam.

30. The compatible optical pickup as claimed in claim 29, wherein the wave plate performs a function of a quarter wave plate with respect to the short wavelength light beam.

31. A compatible optical pickup, comprising:

an optical unit emitting a short wavelength light beam corresponding to a high density optical disc, a first long wavelength light beam corresponding to a first low density optical disc, and a second long wavelength light beam corresponding to a second low density optical disc;

an objective lens forming a light spot on the high density optical disc and the first and second low density optical discs;

a diffractive device diffracting the short wavelength light beam to correct chromatism according to a change in a wavelength of the short wavelength light beam; and a divergent lens refracting the first long wavelength light beam toward the objective lens to increase a working distance with respect to the first low density optical disc:

wherein the optical unit is an optical unit emitting the short wavelength light beam corresponding to the high density optical disc, the first long wavelength light beam having a wavelength of λ1 corresponding to the first low density optical disc, and the second long wavelength light beam having a wavelength of λ2 corresponding to the second low density optical disc, the second low density optical disc having a recording density and a thickness that are different from a recording density and a thickness of the first low density optical disc.

32. The compatible optical pickup as claimed in claim 31, further comprising:

first and second phase correctors correcting an aberration generated during use of the first and second low density optical discs by generating a change in a phase difference with respect to the first and second long wavelength light beams.

33. The compatible optical pickup as claimed in claim 31, further comprising:

an aperture filter changing an effective NA of the objective lens with respect to one of the first and second long wavelength light beams to record and/or reproduce one of the first and second low density optical discs.

34. The compatible optical pickup as claimed in claim 31, further comprising:

a wave plate performing a function of a quarter wave plate with respect to the short wavelength light beam to improve an efficiency of light with respect to the short wavelength light beam.

35. The compatible optical pickup as claimed in claim 31, wherein when the short wavelength light beam output from the optical unit and incident on the diffractive device is a parallel beam, the divergent lens offsets an optical power applied by the diffractive device to the short wavelength light beam and makes the short wavelength light beam be incident on the objective lens as a parallel beam.

36. A compatible optical pickup, comprising:

an optical unit emitting a first wavelength light beam corresponding to a high density optical disc, a second wavelength light beam corresponding to a first low density optical disc, and a third wavelength light beam corresponding to a second low density optical disc;

a diffractive device diffracting the first wavelength light beam to correct chromatism according to a change in a wavelength of the first wavelength light beam; and a divergent lens refracting the second wavelength light beam to increase a working distance with respect to the first low density optical disc;

wherein the optical unit is an optical unit emitting the first wavelength light beam corresponding to the high density optical disc, the second wavelength light beam having a wavelength of λ1 corresponding to the first low density optical disc, and the third wavelength light beam having a wavelength of λ2 corresponding to the second low density optical disc, the second low density optical disc having a recording density and a thickness that are different from a recording density and a thickness of the first low density optical disc.

37. The compatible optical pickup as claimed in claim 36, further comprising:

an objective lens forming a light spot on the high density optical disc, the first low density optical disc, and the second low density optical disc.

38. The compatible optical pickup as claimed in claim 36, further comprising:

first and second phase correctors correcting an aberration generated during use of the first and second low density optical discs by generating a change in a phase difference with respect to the second and third wavelength light beams.

39. The compatible optical pickup as claimed in claim 36, further comprising:

an aperture filter changing an effective NA of the objective lens with respect to one of the second and third wavelength light beams to record and/or reproduce one of the first and second low density optical discs.

40. The compatible optical pickup as claimed in claim 37, further comprising:

a wave plate performing a function of a quarter wave plate with respect to the first wavelength light beam to improve an efficiency of light with respect to the first wavelength light beam.

41. The compatible optical pickup as claimed in claim 37, wherein when the first wavelength light beam output from the optical unit and incident on the diffractive device is a parallel beam, the divergent lens offsets an optical power applied by the diffractive device to the first wavelength light beam and makes the first wavelength light beam be incident on the objective lens as a parallel beam.

42. A compatible optical pickup, comprising:

an optical unit emitting a first light beam having a first wavelength, a second light beam having a second wavelength different from the first wavelength, and a third light beam having a third wavelength different from the first wavelength and the second wavelength;

a first phase corrector generating a change in a phase difference with respect to the first light beam having the first wavelength and transmitting unchanged the second light beam having the second wavelength and the third light beam having the third wavelength to correct an aberration generated during recording and/or reproduction of a first low density optical disc; and a second phase corrector generating a change in a phase difference with respect to the second light beam having the second wavelength and transmitting unchanged the first light beam having the first wavelength and the third light beam having the third wavelength to correct an aberration generated during recording and/or reproduction of a second low density optical disc.

43. The compatible optical pickup as claimed in claim 42, wherein the first light beam having the first wavelength is a first long wavelength light beam corresponding to the first low density optical disc, the second light beam having the second wavelength is a second long wavelength light beam corresponding to the second low density optical disc, and the third light beam having the third wavelength is a short wavelength light beam corresponding to a high density optical disc.

44. The compatible optical pickup as claimed in claim 43, further comprising:

an objective lens forming a light spot on the first low density optical disc with the first long wavelength light beam, forming a light spot on the second low density optical disc with the second long wavelength light beam, and forming a light spot on the high density optical disc with the short wavelength light beam;

a diffractive device diffracting the short wavelength light beam from the optical unit to correct chromatism according to a change in a wavelength of the short wavelength light beam; and a divergent lens refracting the first and second long wavelength light beams from the optical unit toward the objective lens to increase a working distance with respect to the first and second low density optical discs.

45. The compatible optical pickup as claimed in claim 1, wherein the divergent lens makes the first long wavelength light beam and the second long wavelength light beam be incident on the objective lens as diverging beams.

46. The compatible optical pickup as claimed in claim 31, wherein the divergent lens makes the first long wavelength light beam and the second long wavelength light beam be incident on the objective lens as diverging beams.

47. The compatible optical pickup as claimed in claim 37, wherein the divergent lens makes the second wavelength light beam and the third wavelength light beam be incident on the objective lens as diverging beams.

48. The compatible optical pickup as claimed in claim 44, wherein the divergent lens makes the first and second long wavelength light beams be incident on the objective lens as diverging beams.

* * * * *